US008547469B2

(12) United States Patent
Ejima et al.

(10) Patent No.: US 8,547,469 B2
(45) Date of Patent: Oct. 1, 2013

(54) ELECTRONIC CAMERA

(75) Inventors: Satoshi Ejima, Setagaya-Ku (JP);
Kazuya Umeyama, Edogawa-ku (JP);
Takumi Kawahara, Ichikawa (JP);
Toshihisa Kuroiwa, Miura (JP);
Toshiaki Kobayashi, Nishishirakawa-gun (JP); Hirotake Nozaki, Koto-ku (JP); Tomoaki Kawamura, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/929,010

(22) Filed: Dec. 22, 2010

(65) Prior Publication Data
US 2011/0096199 A1   Apr. 28, 2011

Related U.S. Application Data

(63) Continuation of application No. 12/071,670, filed on Feb. 25, 2008, now abandoned, which is a continuation of application No. 10/380,328, filed as application No. PCT/JP02/07111 on Jul. 12, 2002, now abandoned.

(30) Foreign Application Priority Data

Jul. 13, 2001 (JP) ................................. 2001-213524
Jul. 17, 2001 (JP) ................................. 2001-216814
Aug. 14, 2001 (JP) ................................. 2001-245954

(51) Int. Cl.
*H04N 5/222* (2006.01)
(52) U.S. Cl.
USPC ................................................. 348/333.11
(58) Field of Classification Search
USPC .......... 348/14.12, 14.13, 207.2, 220.1, 231.1, 348/231.2, 231.3, 333.01, 333.02, 333.05, 348/333.11, 333.12
See application file for complete search history.

(56) References Cited

U.S. PATENT DOCUMENTS

| 6,239,837 | B1 | 5/2001 | Yamada et al. |
| 6,313,877 | B1 | 11/2001 | Anderson |
| 6,392,697 | B1 | 5/2002 | Tanaka et al. |
| 6,424,795 | B1 | 7/2002 | Takahashi et al. |
| 6,426,771 | B1 | 7/2002 | Kosugi |
| 6,552,743 | B1 | 4/2003 | Rissman |
| 6,738,092 | B1 | 5/2004 | Nakagawa et al. |
| 6,885,395 | B1 | 4/2005 | Rabbani et al. |
| 6,937,273 | B1 | 8/2005 | Loui |
| 6,940,541 | B1 | 9/2005 | Small |

(Continued)

FOREIGN PATENT DOCUMENTS

| JP | A 06-319103 | 11/1994 |
| JP | A 09-135412 | 5/1997 |

(Continued)

*Primary Examiner* — Aung S Moe
*Assistant Examiner* — Chriss Yoder, III
(74) *Attorney, Agent, or Firm* — Oliff & Berridge, PLC

(57) ABSTRACT

An electronic camera of the present invention includes: an imaging unit capturing a subject to generate an original image; a derivative image generating unit reducing resolution or color of the original image to generate a derivative image for transfer; a recording unit recording the original image and the derivative image thereon such that the original image and the derivative image get associated with each other; and a transfer unit transferring the derivative image recorded on the recording unit to an external transfer destination. In this configuration, the recording unit finds the derivative image (original image) by referring to the association with the original image (or derivative image), thereby collectively managing the original image and the derivative image. This makes it possible to prevent a user from being confused at image management due to the original image and the derivative image being the same image.

21 Claims, 15 Drawing Sheets

(56) References Cited

U.S. PATENT DOCUMENTS

| | | |
|---|---|---|
| 6,967,675 B1 | 11/2005 | Ito et al. |
| 7,116,361 B2 | 10/2006 | Baron |
| 7,212,229 B2 | 5/2007 | Parulski et al. |
| 2002/0171747 A1 | 11/2002 | Niikawa et al. |
| 2003/0076427 A1 | 4/2003 | Kawamura et al. |
| 2005/0158015 A1 | 7/2005 | Nakayama et al. |
| 2006/0139474 A1 | 6/2006 | Endsley et al. |

FOREIGN PATENT DOCUMENTS

| | | |
|---|---|---|
| JP | A 10-336574 | 12/1998 |
| JP | A 11-4403 | 1/1999 |
| JP | A 2000-312307 | 11/2000 |
| JP | A 2000-341619 | 12/2000 |
| JP | A 2001-197423 | 7/2001 |
| JP | A 2001-197429 | 7/2001 |
| JP | A 2002-204421 | 7/2002 |
| JP | A 2002-247507 | 8/2002 |
| WO | WO 91/14334 | 9/1991 |

(a) TOP VIEW (b) REAR VIEW

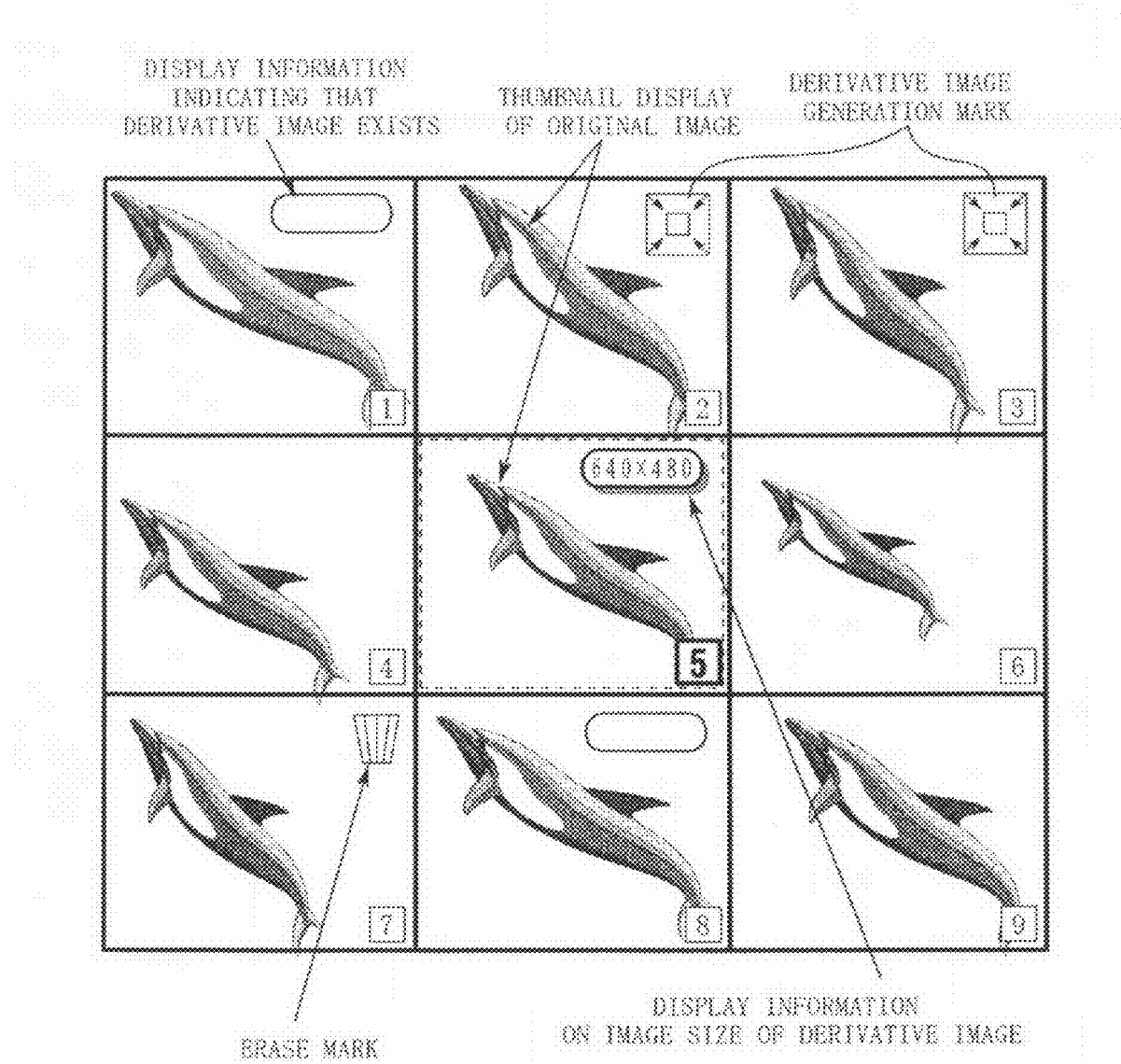

ical field of the invention

ELECTRONIC CAMERA

This application is a continuation of U.S. application Ser. No. 12/071,670, filed Feb. 25, 2008, which is a continuation of application Ser. No. 10/380,328 filed Mar. 13, 2003, which in turn is a National Stage of PCT/JP02/07111 filed Jul. 12, 2002. The prior applications, including the specifications, drawings and abstracts are incorporated herein by reference in their entirety.

TECHNICAL FIELD OF THE INVENTION

The present invention relates to an electronic camera which generates derivative images for external transfer from captured original images. The present invention particularly relates to an image managing technology, an image displaying technology, and a user interface technology for these derivative images.

DESCRIPTION OF THE RELATED ART

In recent years, the pixel density of an electronic camera tends to increase more and more. With this increase in the pixel density, a file space of an image generated in an electronic camera amounts to 1 Mbyte or more even after compression.

Images generated in an electronic camera are outputted to a personal computer, a printer, a mass memory unit, a cellular phone, a digital photograph server on the Internet, and so on when necessary.

When an image of, for example, 1 Mbyte or more per frame is transferred to such external transfer destinations, a problem of a long transfer time arises.

Further, for example, a cellular phone or the like handles images with an extremely lower pixel density compared with that of images handled by a personal computer, a printer, and the like. Therefore, in a case where an image with substantially the same pixel density as images used with a personal computer or a printer is transferred to a cellular phone, the cellular phone cannot receive the image because the image data exceeds its data capacity, resulting in data loss.

For the purpose of solving this problem, the inventor of the present application has come up with an idea that a derivative image with a reduced data size is generated when necessary in an electronic camera to use the derivative image for external transfer.

In this case, however, the derivative image and its original image from which the derivative image is generated both exist in a recording unit of the electronic camera.

This consequently doubles the number of images to be managed in the electronic camera, and there arises a problem that management of images in the electronic camera may be complexed to a great extent.

In particular, since these original image and derivative image are the same image, a user has a difficulty in clearly distinguishing the original image and the derivative image on the small monitor screen of the electronic camera and in accurately selecting from the two. As a result, the user may mistakenly transfer the original image instead of the derivative image or vice versa to the exterior.

DISCLOSURE OF THE INVENTION

In view of solving the above-described problems, it is an object of the present invention to provide a technology for appropriately managing derivative images which are generated for use of external transfer.

It is another object of the present invention to provide an image displaying technology for distinguishing between an original image and a derivative image with ease.

It is still another object of the present invention to provide a user interface technology which achieves an easy and accurate discrimination operation on an image to be transferred.

Hereinafter, the present invention will be explained.

(1) An electronic camera of the present invention includes: an imaging unit for capturing a subject to generate an original image; a derivative image generating unit for reducing resolution or color of the original image to generate derivative image(s) for transfer; a recording unit recording the original image and the derivative image thereon in such a manner that the original image the derivative image get associated with each other; and a transfer unit transferring the derivative image recorded on the recording unit to an external transfer destination.

With this structure, the derivative image (or original image) can be specified by utilizing its association with its original image (or derivative image). This can realize comprehensive image management of the original image and the derivative image with ease based on the original-derivative image associations.

It is preferable that, for example, the recording unit manages the derivative image (or original image) in the same way as it manages its original image (or derivative image) by making use of the associations described above. This eliminates the necessity of separately managing the original image and the derivative image.

(2) In another electronic camera of the present invention, the recording unit of the electronic camera in the above description (1) includes: a folder in which the original image is recorded; and lower folders being under the folder hierarchically and in which the derivative images are separately recorded depending on their respective image sizes, in order to manage the derivative images by size in a hierarchical manner.

Such hierarchical management enables appropriate image management of the original image and the derivative image. Especially, using the lower folders exclusively for storing the derivative images can prevent a user from mistakenly storing the original image in the lower folders, thereby enabling accurate discrimination between the original image and the derivative image in image management.

(3) In another electronic camera of the present invention, the transfer unit of the electronic camera in the above description (1) obtains information on the external transfer destination from the external transfer destination or a user, and the derivative image generating unit determines an image format corresponding to the information on the external transfer destination to generate a derivative image according to the image format.

By structuring the electronic camera in this way, it is made possible to properly generate derivative images of the image format suitable for the external transfer destination. This can further eliminate the necessity of users' manually changing the image format of the derivative image every time the external transfer destination is changed.

(4) In another electronic camera of the present invention, the electronic camera in the above description (1) further includes an erase control unit for receiving an erase command for the original image from a user. The recording unit erases the original image in compliance with the erase command, and then retrieves and erases a recorded derivative image which is associated with the original image.

By structuring the electronic camera in this way, in accordance to the erase of the original image, its corresponding derivative image is also erased. This eliminates a disadvantage that upon erasing an original image, the user forgets erasing its derivative images, leaving them in the electronic camera. In addition, from the users' point of view, they need not separately erase the original image and its derivative image since what they have to pay attention to is to erase the original image.

(5) In another electronic camera of the present invention, the recording unit of the electronic camera in the above description (1) erases a derivative image which has been transferred by the transfer unit. Structuring the electronic camera in this way eliminates a disadvantage that externally transferred derivative images remain in the electronic camera.

(6) Another electronic camera of the present invention is configured such that the electronic camera in the above description (1) additionally includes a storage space monitoring unit for determining an available storage space of the recording unit and finding a shortage in the available storage space. The recording unit erases all or a part of the derivative images when the storage space monitoring unit finds a shortage in the available storage space.

It is possible to prevent the accumulation of the derivative images, thereby accordingly solving the shortage in the available storage space.

(7) Another electronic camera of the present invention is characterized in that the electronic camera in the above description (1) further includes a transfer control unit for receiving from a user a file transfer command for the original image, and the recording unit file-transfers the original image in compliance with the file transfer command and retrieves, for file-transfer, a derivative image which has been recorded in association with original image.

Structuring the electronic camera in this way solves a problem that the derivative image remains at its original position, separately from the original image after the original image is file-transferred. This also allows a user to pay attention only to the file transfer of the original image, eliminating the necessity for the user to perform the file transfer of the original image and the derivative image separately.

(8) Another electronic camera of the present invention is characterized in that the electronic camera in the above description (1) further includes a protect control unit for receiving from a user a protect command for the original image, and the recording unit sets a protect attribute on the original image in compliance with the protect command, and retrieves a derivative image which has been recorded in association with the original image to set the protect attribute on this derivative image.

Structuring the electronic camera in this way solves a problem that the derivative image without the protect attribute is mistakenly erased even though its original image has the protect attribute set thereon. This eliminates the necessity for the user to set the protect attribute on the original image and the derivative image separately, allowing the user to pay attention only to the protect setting on the original image.

(9) Another electronic camera of the present invention is characterized in that the electronic camera in the above description (1) further includes an original image erase control unit for receiving only an erase command for the original image from a user, in which the recording unit erases the original image in compliance with the erase command, and retrieves a derivative image which has been recorded in association with the original image, and upgrades this derivative image to the original image.

Structuring the electronic camera in this way can prevent a problem that the user forgets that a derivative image having no original image remains in the electronic camera, leaving the derivative image therein without processing it. Note that the recording unit preferably upgrades a derivative image of the largest image size to an original image when a plurality of corresponding derivative images is present. Moreover, it is preferable that the recording unit records the original image to which the derivative image has been upgraded, in association with remaining derivative images.

(10) Another electronic camera of the present invention is characterized in that the imaging unit of the electronic camera in the above description (1) selectively has a moving image capture mode in which a subject is captured as moving images, and the derivative image generating unit generates, for the original image captured in the moving image capture mode (namely, moving images), a derivative image by reducing resolution or color of one frame of the original image.

Such generation of the derivative image from one frame of the moving images enables reduction in processing load taken for generating the derivative image from the moving images. It is also made possible that captured moving images are not transferred immediately after the capture, but only one frame of the derivative image is transferred for a trial instead.

(11) Another electronic camera of the present invention is characterized in that the imaging unit of the electronic camera in the above description (1) selectively has a continuous capture mode in which a subject is captured as continuous static images, in which the derivative image generating unit generates, for an original image captured in the continuous capture mode (namely, plural static images), derivative images (namely, plural static images) by reducing resolution or color of each frame of the original image.

Structuring the electronic camera in this way eliminates the necessity for the user to generate the derivative images frame by frame separately from the continuously shot static images. This results in realizing a very usable electronic camera.

(12) Another electronic camera of the present invention is characterized in that the electronic camera in the above description (1) further includes a thumbnail generating unit generating a thumbnail image for thumbnail display from the original image and appending the generated thumbnail image to the original image, and the thumbnail generating unit does not append the thumbnail image to the original image when the number of pixels of the thumbnail image is equal to or larger than the number of pixels of the derivative image.

Not appending the thumbnail image to the original image can reduce the file size of the original image properly. Note that the derivative image is preferably used in place of the thumbnail image in the case of not appending the thumbnail to the original image as described above.

(13) Another electronic camera of the present invention includes: an imaging unit for capturing a subject to generate an original image; a derivative image generating unit for reducing resolution or color of the original image to generate a derivative image for transfer; a recording unit recording the original image and the derivative image thereon; a transfer unit transferring the derivative image recorded on the recording unit to an external transfer destination; and a control unit erasing from the recording unit a derivative image which has been transferred to exterior by the transfer unit.

Structuring the electronic camera in this way eliminates a problem that the derivative image which has been transferred continues to remain in the electronic camera.

(14) Another electronic camera of the present invention is characterized in that the electronic camera in the above description (1) further includes a display unit displaying an image or information on the image, wherein the display unit discriminates between the original image and the derivative image and decides the derivative image as non-display.

In such a structure, not displaying (hiding) the derivative image on the screen makes it possible to prevent, with sureness, the user from being confused because the original image and the derivative image being the same image appear on the screen. In addition, deciding the derivative image as non-display reduces the number of images to be displayed. This enables the user to quickly find a target image from a small number of display images.

(15) Another electronic camera of the present invention is characterized in that the electronic camera in the above description (1) further includes a display unit displaying an image or information on the image, and the display unit displays information on the image size of the derivative image in addition to the derivative image.

Such a structure of the electronic camera enables the user to accurately distinguish the original image and the derivative image being the same image, according to the displayed image size.

(16) Another electronic camera of the present invention is characterized in that the electronic camera in the above description (1) further includes a display unit displaying an image or information on the image, and the display unit displays a derivative image when the user performs a predetermined operation during the display of the original image, and displays derivative images in the order of their image sizes according to the user's operation when a plurality of derivative images generated from the same original image are present.

With such a structure of the electronic camera, when the predetermined user's operation is performed during the display of the original image, its corresponding derivative image is displayed. In this case, first displayed is the original image and next is the derivative image, therefore, the user can accurately distinguish the original image and the derivative image being the same image according to the display order.

Further, in a case where a plurality of derivative images generated from the same original image are present, the derivative images are displayed in the order of their image sizes according to the user's operation. This enables the user to accurately decide a magnitude relation of plural images being the same image, according to the display order.

(17) Another electronic camera of the present invention is characterized in that the electronic camera in the above description (1) further includes a display unit displaying an image or information on the image, and the display unit, upon deciding the original image as non-display, decides a derivative image generated from this original image as non-display.

Structuring the electronic camera in this way can prevent occurrence of a problem that a derivative image of the original image as non-display is displayed. Further, the user need not set non-display twice separately for the original image and its derivative image being the same image, therefore, the user can save his/her labor.

(18) Another electronic camera of the present invention is characterized in that the electronic camera in the above description (1) further includes a display unit displaying an image or information on the image, and the display unit discriminates between the original image and the derivative image and does not display the original image and the derivative image concurrently on the screen.

In such a structure, the original image and the derivative image being the same image are not displayed together on the same screen, which can prevent the user from being confused because of his/her inability to distinguish the images. Further, the original image and the derivative image being the same image are not displayed at the same time so that many different images can be concurrently displayed. This enables the user to quickly find a target image from various images in a display list.

(19) Another electronic camera of the present invention is characterized in that the electronic camera in the above description (1) further includes a slide display unit automatically displaying a plurality of images in sequence, and the slide display unit separates the plurality of images into original images and derivative images to automatically display either of the original images and the derivative images.

Structuring the electronic camera in this way can prevent redundant slide displays of the original images and the derivative images being the same image. As a result, the user can look through all images in a relatively short time, or he/she can take his/her time as much as he/she wants to look through all images since it is made possible to elongate the display time per frame without elongating the total display time.

(20) In another electronic camera of the present invention, the transfer unit of the electronic camera in the above description (1) has a function of transferring the original image in addition to a function of transferring the derivative image. This electronic camera further includes a transfer setting unit setting a flag on an image designated by a user's input, the flag indicating a transfer candidate of the transfer unit. Specifically, the derivative image generating unit of this electronic camera, when generating the derivative image from the original image having a flag thereon, removes the flag from this original image and sets the flag on the generated derivative image.

Such a structure enables the user to freely select an image to be transferred by performing the following operations ① and ②.

① The user selects an image to be transferred from original images and temporarily sets the flag on the selected original image.

② The user thereafter selects from the original images a to-be-transferred image with reduced file space, thereby generating a derivative image.

At this time, the electronic camera shift the flag from the original image to the derivative image generated in the operation ②. On the other hand, the original image continues to have the flag in case where the derivative image is not generated from the original image. Performing the operations ① and ② enables the user to set the flag on either the original image or the derivative image when necessary.

The operations ① and ② are both intended for the original image. Therefore, the user need not pay attention to the derivative image when performing these operations, and can set the flag mainly on original images by an intuitive and simple operation.

(21) Another electronic camera of the present invention is so structured that the transfer unit of the electronic camera in the above description (1) further has a function of transferring the original image in addition to a function of transferring the derivative image. This electronic camera further includes a transfer setting unit setting a flag on an image designated by user's input, the flag indicating a transfer candidate of the transfer unit.

Specifically, the transfer setting unit of this electronic camera, when the original image selected by the user's input has its derivative image, sets the flag not on the original image but on the derivative image.

Such a structure enables the user to freely select an image to be transferred by performing the following operations ③ and ④.

③ The user selects from original images an image to be transferred with reduced file space and temporarily generates a derivative image.

④ The user thereafter selects an image to be transferred from the original images and sets the flag on the selected original image.

At this time, the electronic camera shifts, at the operation ④, the flag from the original image to the derivative image generated in the operation. On the other hand, the original image continues to have the flag when the derivative image is not generated from the original image in the operation ③. The user can allot the flag to the original image and the derivative image when necessary by performing the operations ③ and ④.

The operations ③ and ④ are both intended for the original images. Therefore, the user need not pay attention to the derivative image when performing these operation, and can set the flag mainly on original images by an intuitive and simple operation.

Note that it is more preferable to carry out both the inventions described in (20) and (21) together. In this case, the user is allowed to carry out either the above operations ① and ② or operations ③ and ④. Also, performing the above operations ① and ② in a reverse order is equivalent to performing the operations ③ and ④. In other words, by combining both of the inventions in (20) and (21), the user is allowed to execute the aforesaid operations ① and ② in any order. This enables the user to set the flag on the original and derivative images more freely without taking the operation order into account.

(22) Another electronic camera of the present invention is so structured that the transfer unit of the electronic camera in the above description (1) further has a function of transferring the original image in addition to a function of transferring the derivative image. This electronic camera further includes: a transfer setting unit setting a flag on an image designated by user's input, the flag indicating a transfer candidate of the transfer unit; and an erase unit erasing an image designated by a user's input.

Especially, the transfer setting unit of this electronic camera erases, in response to the erase of the original image, a derivative image generated from this original image, and removes the flag from the derivative image.

With such a structure, the user need not remove the flags of remaining derivative images in another time after erasing the original image, and can operate the electronic camera in a simpler manner.

(23) Another electronic camera of the present invention is so structured that the transfer unit of the electronic camera in the above description (1) further has a function of transferring the original image in addition to a function of transferring the derivative image. This electronic camera further includes: a transfer setting unit setting a flag on an image designated by user's input, the flag indicating a transfer candidate of the transfer unit; and an erase unit erasing an image designated by user's input.

Especially, the transfer setting unit of this electronic camera, when the derivative image having the flag set thereon is erased, sets the flag on an original image from which the derivative image is generated.

With such a structure, when the user wants to return the flag to the original image from the derivative image, he/she should first erase an unnecessary derivative image which is no longer a candidate of the transfer. By this user's operation, the electronic camera shifts the flag from the derivative image to the original image. Therefore, the user need not shift the flag explicitly, and can operate the electronic camera in a simpler way.

(24) Another electronic camera of the present invention is so structured that the transfer unit of the electronic camera in the above description (1) further has a function of transferring the original image in addition to a function of transferring the derivative image, This electronic camera further includes a transfer setting unit setting a flag on an image designated by user's input, the flag indicating a transfer candidate of the transfer unit.

Especially, the transfer setting unit of this electronic camera sets the flag on all original images with print information, irrespective of whether or not these original images have their derivative images.

The original images having print information are likely to be used for printing purpose at their external transfer destinations. For the printing use, the original image having large image information is more preferable in view of image quality than the derivative image with reduced file space. Hence, setting the flag on the original images having the print information as described above can surely improve the print image quality at the external transfer destination.

BRIEF DESCRIPTION OF THE DRAWINGS

The above-described objects and other objects of the present invention will be made apparent with reference to the following description and the attached drawings.

FIG. 16 shows thumbnail display.

BEST MODE FOR CARRYING OUT THE INVENTION

Hereinafter, embodiments according to the present invention will be explained with reference to the drawings.

<<First Embodiment>>

A first embodiment is an embodiment of an electronic camera corresponding to the inventions of claims 1, 4, 5, 7 to 9, 12, and 13.

[Configuration Description of Electronic Camera]

Figure 1:
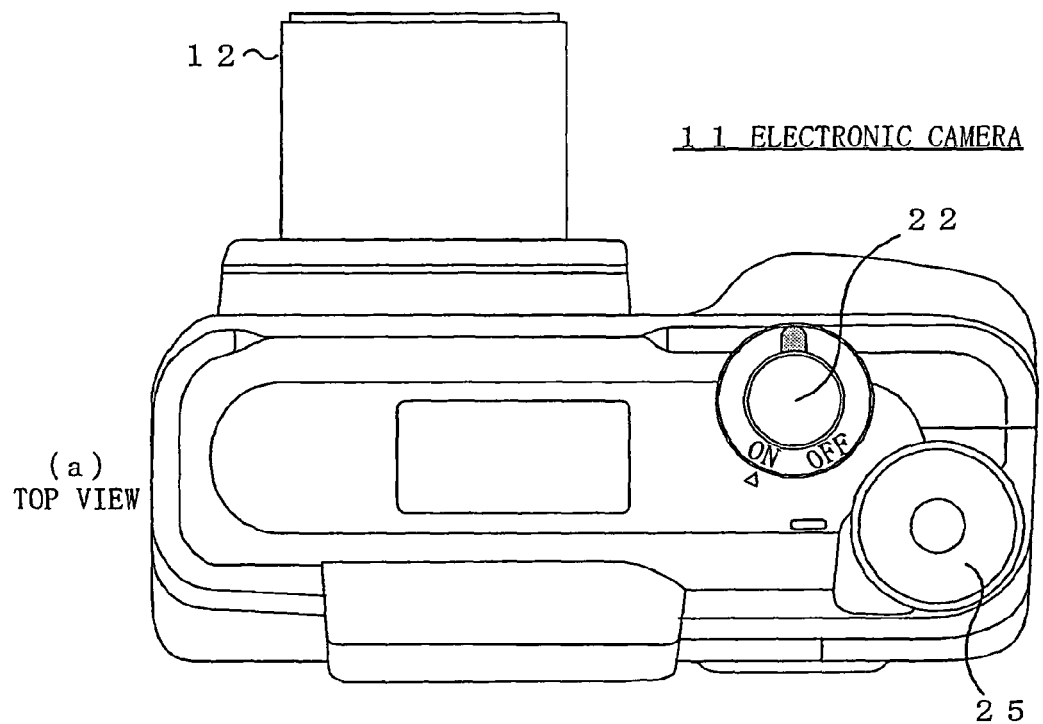
FIG. 1(a) and FIG. 1(b) are views each showing an external appearance of an electronic camera 11.
Figure 1:
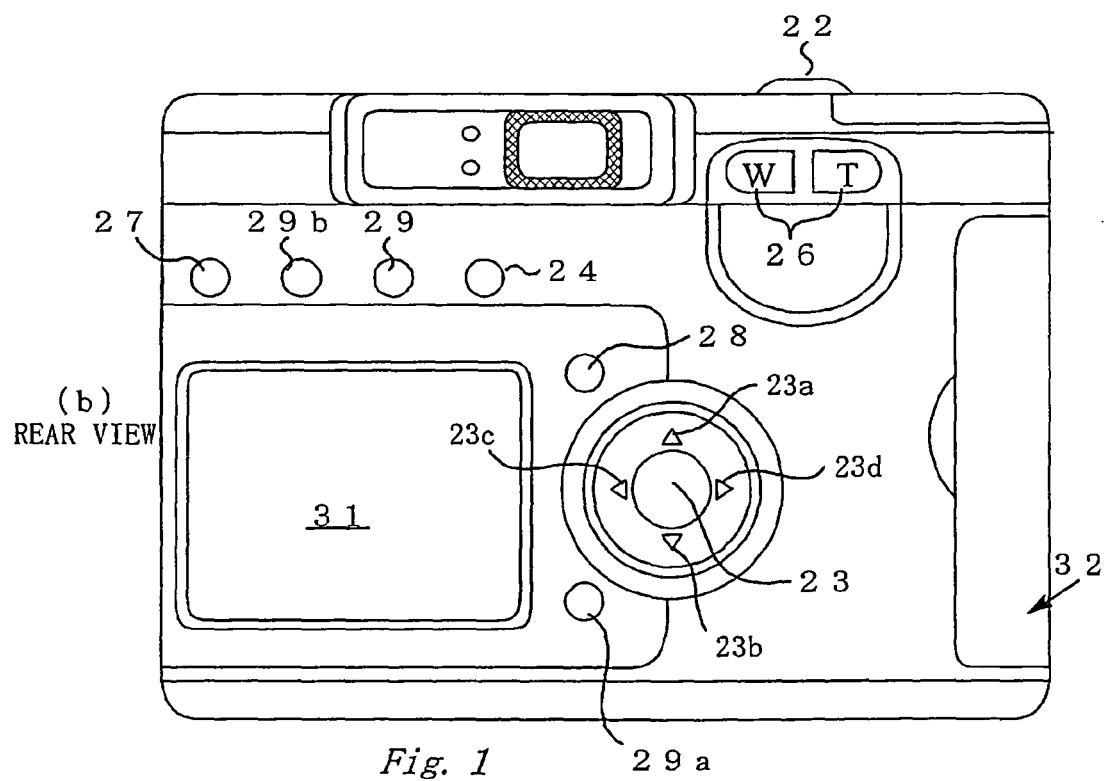
Figure 2:
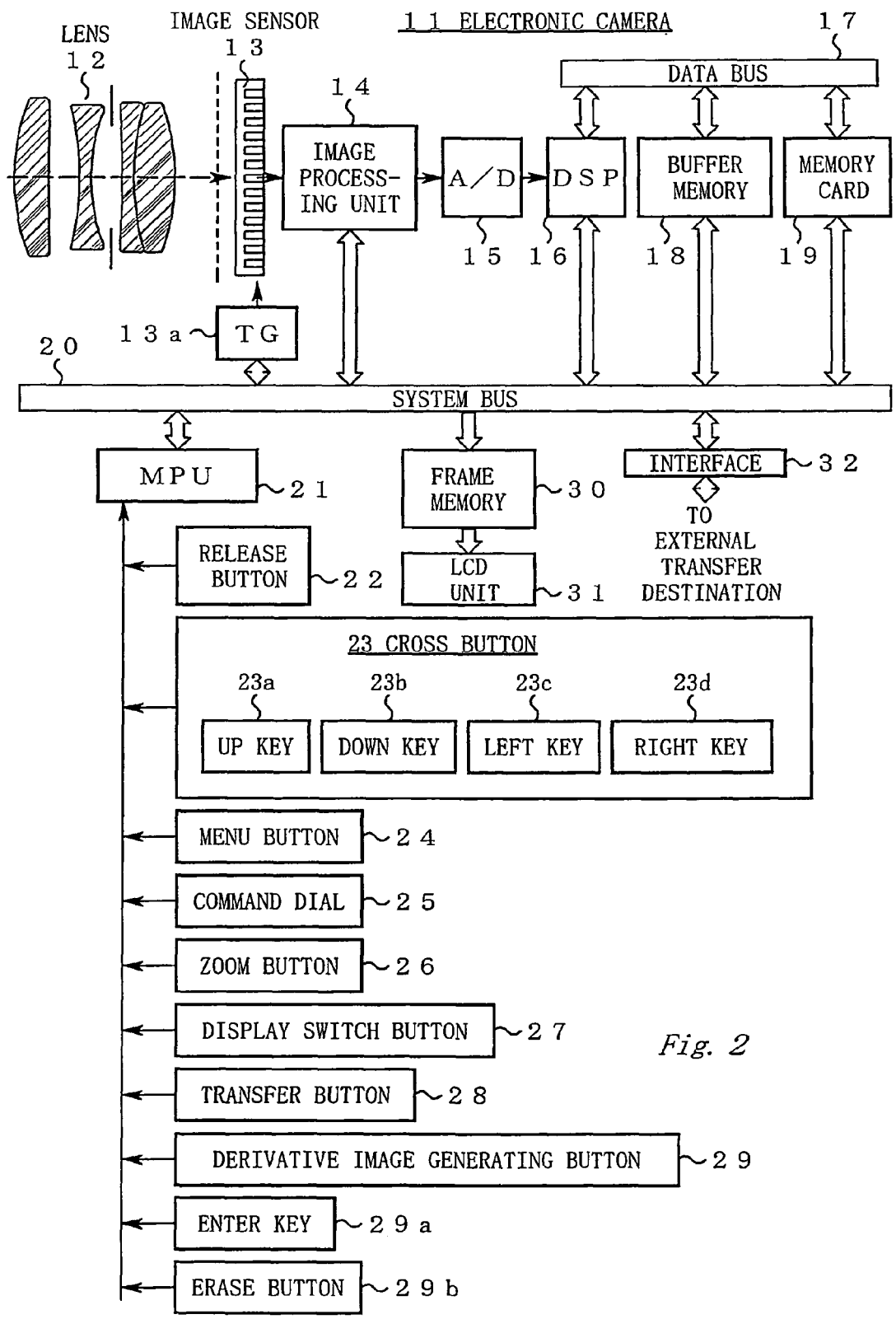
FIG. 2 is a block diagram explaining the configuration of the electronic camera 11.

FIG. 1(a) and FIG. 1(b) are views each showing an external appearance of this electronic camera 11. Note that FIG. 1(a) is a top view of the electronic camera 11, and FIG. 1(b) is a rear view of the electronic camera 11. FIG. 2 is a block diagram explaining the internal configuration of the electronic camera 11.

Hereinafter, the configuration of the electronic camera 11 will be explained with reference to these FIG. 1 and FIG. 2.

First, a lens 12 is attached to the electronic camera 11. An image sensor 13 is disposed in an image space of this lens 12. This image sensor 13 is controlled by a timing generator 13a and captures a subject. The image captured by this image sensor 13 (namely, an original image) is digitized by an image processing unit 14 and an A/D converting unit 15, and thereafter, given to a digital signal processor (hereinafter, referred to as a DSP) 16. This DSP 16 is connected to a buffer memory 18 and a memory card 19 via a data bus 17. The DSP 16 performs two-dimensional image processing, image compression processing, and so on for the original image while exchanging image data with this buffer memory 18. The original image processed in the DSP 16 is recorded on the memory card 19 in an EXIF file format.

Meanwhile, the aforesaid timing generator 13a, image processing unit 14, DSP 16, buffer memory 18, and memory card 19 are connected to a microprocessor (hereinafter, referred to as an MPU) 21 via a system bus 20 for control and data transfer.

To this MPU 21, connected are a release button 22, a cross button 23, a menu button 24, a command dial 25, a zoom button 26, a display switch button 27, a transfer button 28, a derivative image generating button 29, an enter key 29a, and an erase button 29b.

Note that the aforesaid cross button 23 is constituted of four-direction keys consisting of an up key 23a, a down key 23b, a left key 23c, and a right key 23d.

A frame memory 30 is connected to the aforesaid system bus 20. Image data in this frame memory 30 is displayed on a liquid crystal display unit 31 provided on a rear face of the electronic camera 11.

To the aforesaid system bus 20, further connected is an interface 32 transferring an image having a flag, to an external transfer destination in response to the operation to the transfer button 28.

[Relation with the Invention]

Hereinafter, the relation between the inventions and the first embodiment will be explained. It should be noted that the relation here only illustrates one interpretation for reference and is not intended to limit the present invention more than necessary.

An imaging unit described in the claims corresponds to the image sensor 13, the timing generator 13a, the image processing unit 14, the A/D converting unit 15, and the DSP 16.

A derivative image generating unit described in the claims corresponds to 'a derivative image generating function' of the MPU 21 (or the DSP 16).

A recording unit described in the claims corresponds to 'a function of file management of the memory card 19' of the MPU 21.

A transfer unit described in the claims corresponds to the interface 32.

An erase control unit described in the claims corresponds to 'a function of receiving an erase command for the original image from a user's operation or the like of the cross button 23' of the MPU 21.

A transfer control unit described in the claims corresponds to 'a function of receiving a file transfer command for an original image from a user's operation or the like of the cross button 23' of the MPU 21.

A protect control unit described in the claims corresponds to 'a function of receiving a protect command for an original image from a user's operation or the like of the cross button 23' of the MPU 21.

An original image erase control unit described in the claims corresponds to 'a function of receiving an erase command for only an original image from a user's operation or the like of the cross button 23' of the MPU 21.

A thumbnail generating unit described in the claims corresponds to 'a function of generating a thumbnail image to append it to a file header of an original image' of the MPU 21 (or the DSP 16).

A control unit described in the claims corresponds to 'a function of erasing from the memory card 19 a derivative image which has been transferred' of the MPU 21.

[Description on Derivative Image Generating Process]

Figure 3:
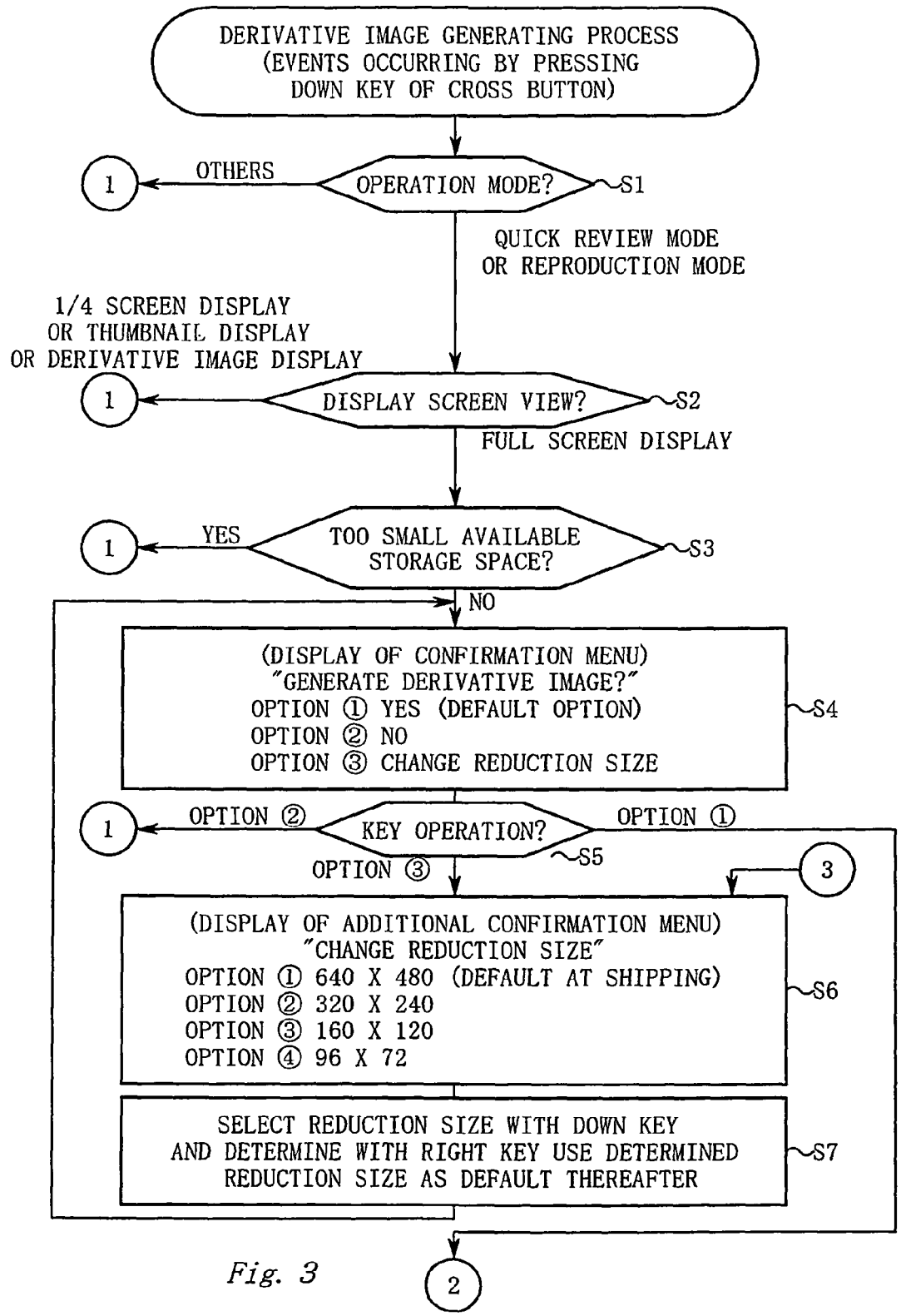
FIG. 3 is a flowchart (1/2) explaining a derivative image generating process.
Figure 4:
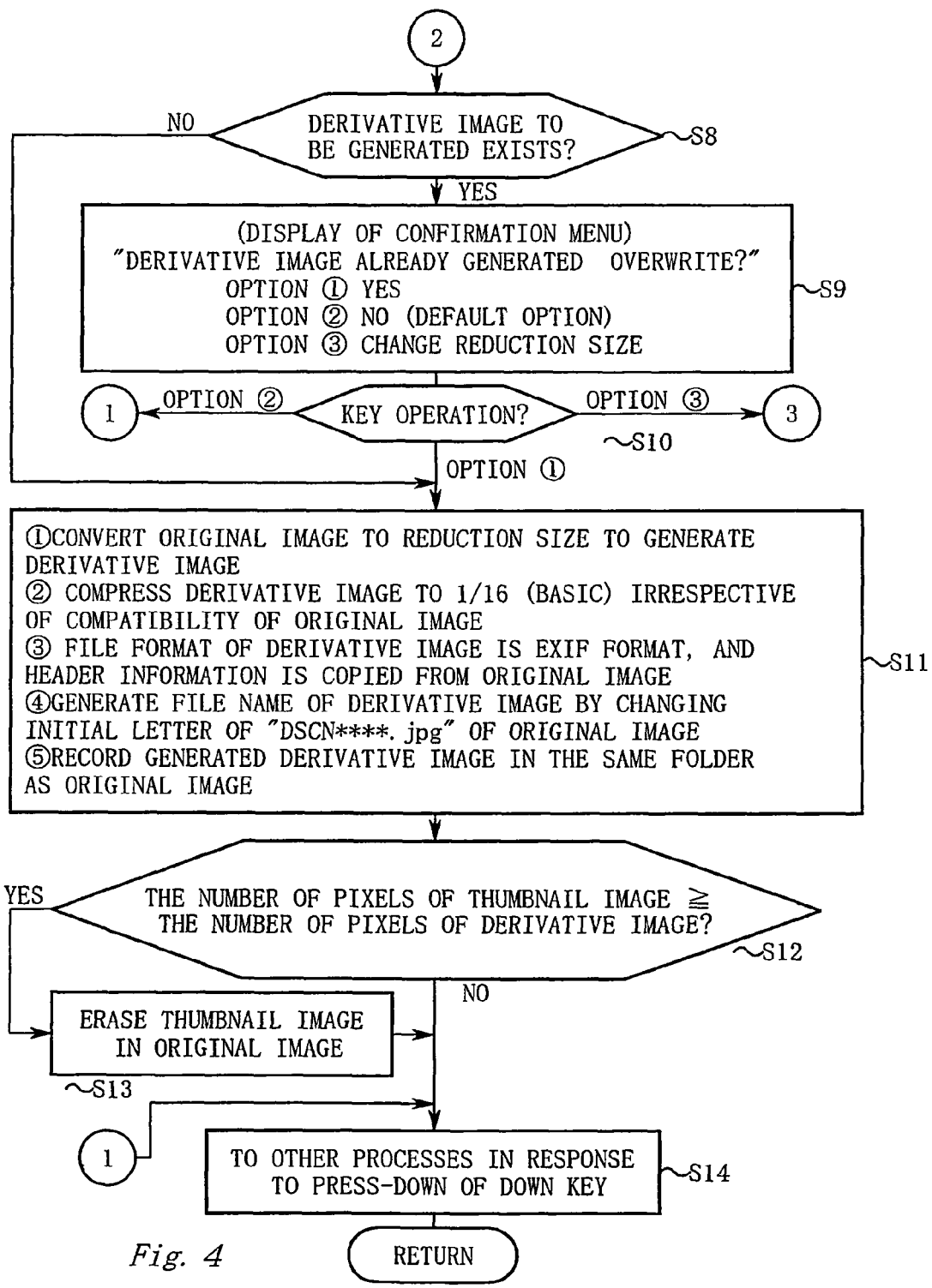
FIG. 4 is a flowchart (2/2) explaining the derivative image generating process.

FIG. 3 and FIG. 4 are flowcharts explaining a derivative image generating process. Note that this process starts as a part of processes in response to pressing of the down key 23b. Hereinafter, the derivative image generating process will be explained following the steps in FIG. 3 and FIG. 4.

Step S1: When a user presses down the down key 23b, the MPU 21 first determines a current operation mode of the electronic camera 11.

Here, when the current operation mode is a quick review mode (a mode to display on the liquid crystal display unit 31 an image immediately after being captured) or a reproduction mode (a mode to reproduce an image in the memory card 19 for display on the liquid crystal display unit 31), the MPU 21 shifts its operation to Step S2.

On the other hand, in the case where the current operation mode is of other operation modes, the MPU 21 shifts its operation to Step S14.

Step S2: The MPU 21 determines a current display status of the liquid crystal display unit 31.

When the original image is displayed on the full screen, the MPU 21 shifts its operation to Step S3.

On the other hand, in the case where the liquid crystal display unit 31 has other display status (a ¼ screen display, a thumbnail display, a derivative image display, or the like), the MPU 21 shifts its operation to Step S14.

Step 3: The MPU 21 obtains information on an available storage space of the memory card 19.

Here, when the storage space currently available is too small to store a new derivative image, the MPU 21 gives up generating a new derivative image and shifts its operation to Step S14.

On the other hand, when the storage space currently available is large enough to store the derivative image, the MPU 21 shifts its operation to Step 4.

Step S4: The MPU 21 overlappinly displays the following confirmation menu on a display image on the liquid crystal display unit 31.
Header "Generate a derivative image?"
Option ① Yes (default option)
Option ② No
Option ③ Change reduction size
Step S5: The MPU 21 monitors a user's operation to the cross button 23 to receive a selected one of the above options ① to ③.

Specifically, a user hits the right key 23*d* once, determining selection of the option ①. In this case, the MPU 21 shifts its operation to Step S8.

The user hits the right key 23*d* once after hitting the down key 23*b* once, determining selection of the option ②. In this case, the MPU 21 stops generating a new derivative image to shifts its operation to Step S14.

Meanwhile, the user hits the right key 23*d* once after hitting the down key 23*b* twice, determining selection of the option ③. In this case, the MPU 21 shifts its operation to Step S6.

Step S6: The MPU 21 additionally displays the following confirmation menu on the display image on the liquid crystal display unit 31.
Header "Change reduction size"
Option ① 640×480 (default at the shipping time)
Option ② 320×240
Option ③ 160×120
Option ④ 96×72
Step S7: The MPU 21 monitors the user's operation to the cross button 23 to receive the selection and determination of the image size (reduction size) of the derivative image. The MPU 21 uses the image size determined here as a default thereafter. After this operation, the MPU 21 shifts its operation back to Step S4.

Step S8: The MPU 21 searches files in the memory card 19 to determine whether or not a derivative image to be generated already exists.

When the derivative image to be generated already exists here, the MPU 21 shifts its operation to Step S9.

On the other hand, when the derivative image to be generated does not exist, the MPU 21 shifts its operation to Step S11.

Step S9: The MPU 21 overlappingly displays the following confirmation menu on the display image on the liquid crystal display unit 31.
Header "A derivative image already generated. Overwrite?"
Option ① Yes
Option ② No (default option)
Option ③ Change reduction size
Step S10: The MPU 21 monitors the user's operation to the cross button 23 to receive a selected one of the above options ① to ②.

Specifically, the user hits the right key once, determining selection of the option ②. In this case, the MPU 21 stops generating a new derivative image to shift its operation to Step S14.

The user hits the right key 23*d* once after hitting the down key 23*b* once, determining selection of the option ③. In this case, the MPU 21 shifts its operation to Step S6.

Meanwhile, the user hits the right key 23*d* once after hitting the up key 23*a* once, determining selection of the option ①. In this case, the MPU 21 shifts its operation to Step S11.

Step 11: In the case of the reproduction mode, the MPU 21 reads out from the memory card 19 a compressed file of the original image currently displayed on the liquid crystal display unit 31 to store this compressed file in the buffer memory 18. The DSP 16 expands this compressed file to develop the original image in the buffer memory 18.

On the other hand, in the case of the quick review mode, the original image immediately after being captured has been developed in the buffer memory 18 by the MPU 21.

The MPU 21 (or the DSP 16) performs resolution-conversion on this original image in the buffer memory 18 to have an image of a default image size to generate a derivative image.

The DSP 16 compresses this derivative image to, for example, about 1/16 irrespective of the compressibility of the original image.

The MPU 21 copies header information of the original image, appends it to the compressed data of the derivative image to generate a compressed file in the EXIF file format.

Further, the MPU 21 replaces an initial letter of a file name "DSCN****.jpg" of the original image with a letter (for example, "S" or the like) according to the image size to create a file name of the derivative image. The associations between the original image and the derivative image are made according to the file name rule.

The MPU 21 records thus generated file of the derivative image in the same folder as the original image in the memory card 19.

Step S12: The MPU 21 compares the number of pixels of a thumbnail image appended in the file of the original image with the number of pixels of the derivative image newly generated.

When the number of the pixels of the thumbnail image is equal to or larger than the number of the pixels of the derivative image here, the MPU 21 shifts its operation to Step S13.

On the other hand, when the number of the pixels of the thumbnail image is smaller than the number of the pixels of the derivative image, the MPU 21 shifts its operation to Step S14.

Step S13: The MPU 21 erases the thumbnail image from the file of the original image to reduce a file space of the original image. Thereafter, when the thumbnail image of the original image is required, the derivative image is used as a substitute for the thumbnail image.

Step S14: The MPU 21 calls other process routines which are to be executed when the down key 23*b* is pressed down.

Through the operations explained above, the derivative image generating process is completed.

[Description on File Manipulation of Images]

Figure 5:
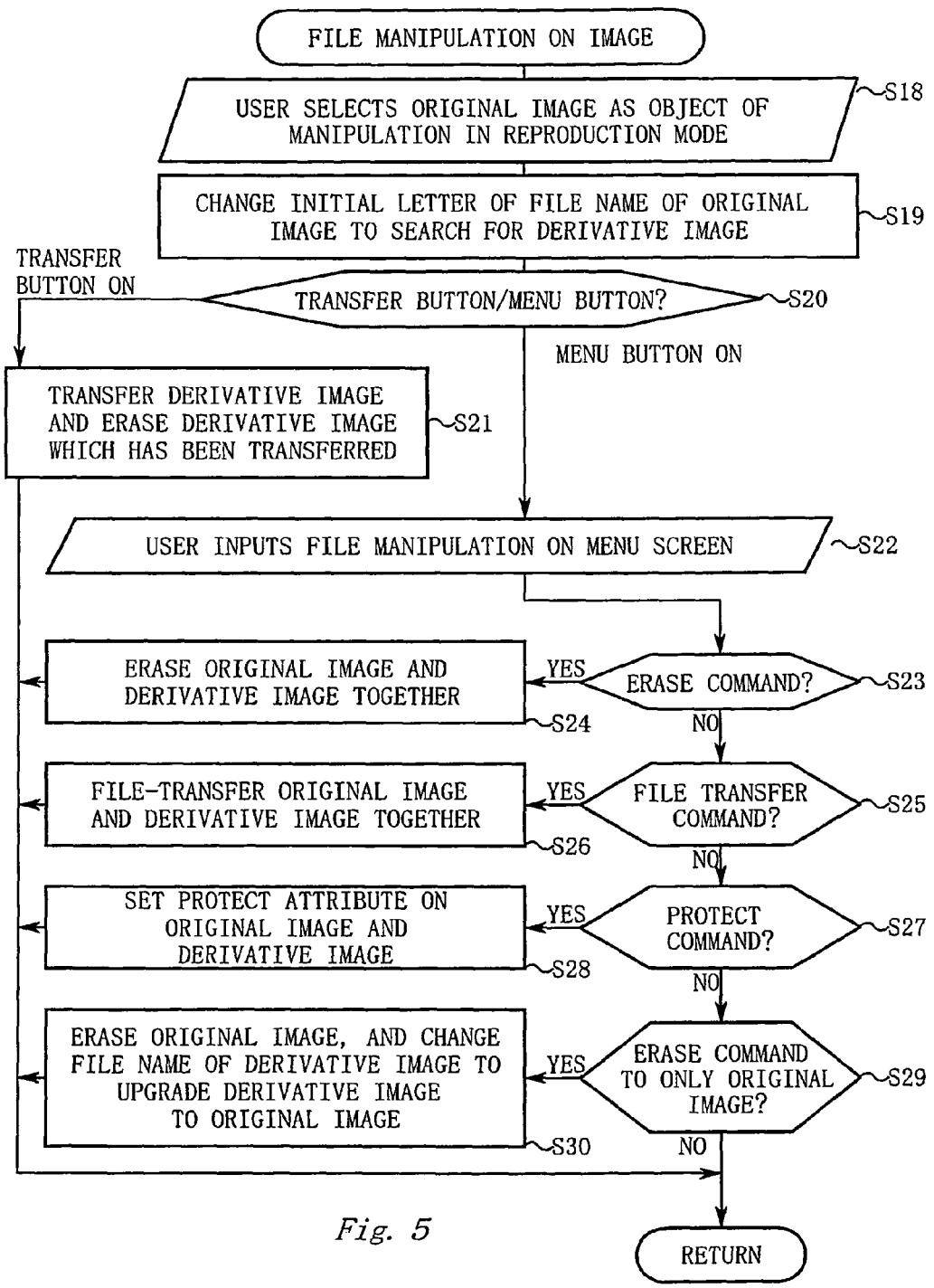
FIG. 5 is a flowchart showing a process routine of file manipulation.

FIG. 5 is a flowchart showing a process routine of file manipulation. Hereinafter, the file manipulation to images will be explained following the steps shown in FIG. 5.

Step S18: The user first switches the mode of the electronic camera 11 to the reproduction mode, and selects on the liquid crystal display unit 31 an original image as an object of the file manipulation.

Step S19: When the original image as the object of the manipulation is selected, the MPU 21 changes the initial letter of the file name of this original image to create the file name of a derivative image. The MPU 21 searches the memory card 19 for the file name of the derivative image and determines whether or not the concerning derivative image exists.

Step S20: Next, the MPU 21 monitors the user's operation to the menu button 24 and the transfer button 28.

When the transfer button 28 is pressed down here, the MPU 21 shifts its operation to Step S21.

On the other hand, when the menu button 24 is pressed down, the MPU 21 shifts its operation to Step S22.

Step S21: When the original image as the object of the manipulation has a derivative image, the MPU 21 transfers this derivative image to a preset external transfer destination via the interface 32. Upon completion of the transfer operation, the MPU 21 erases from the memory card 19 the derivative image which has been transferred, to thereby increase an available storage space of the memory card 19.

Meanwhile, when the original image as the object of the manipulation does not have any derivative image, the original image is transferred as it is to the external transfer destination via the interface 32.

After such file manipulation, the MPU 21 completes the file manipulation process routine.

Step S22: The MPU 21 displays a menu screen on the liquid crystal display unit 31 in response to the menu button 24 being pressed down. The user operates the cross button 23 referring to the menu screen on the liquid crystal display unit 31 to input a desired file manipulation command.

Step S23: When the user selects a file erase command to the original image, the MPU 21 shifts its operation to Step S24. In other cases, the MPU 21 shifts its operation to Step S25.

Step S24: The MPU 21 erases from the memory card 19 the original image as the object of the manipulation. Note that, when the original image as the object of the manipulation has a derivative image, the MPU 21 erases this derivative image together. After such file manipulation, the MPU 21 finishes the file manipulation process routine.

Step S25: When the user selects a file transfer command to the original image, the MPU 21 shifts its operation to Step S26. In other cases, the MPU 21 shifts its operation to Step S27.

Step S26: The MPU 21 file-transfers the original image as the object of the manipulation to a folder designated by the user. Note that, when the original image as the object of the manipulation has a derivative image, the MPU 21 file-transfers this derivative image together. After such file manipulation, the MPU 21 finishes the file manipulation process routine.

Step S27: When the user selects a protect command for the original image, the MPU 21 shifts its operation to Step S28. In other cases, the MPU 21 shifts its operation to Step S29.

Step S28: The MPU 21 appends a protect attribute to the file of the original image as the object of the manipulation. Note that, when the original image as the object of the manipulation has a derivative image, the MPU 21 appends the protect attribute to the file of this derivative image as well. After such file manipulation, the MPU 21 finishes the file manipulation process routine.

Step S29: When the user selects an erase command to only the original image, the MPU 21 shifts its operation to Step S30. In other cases, the MPU 21 finishes the file manipulation process routine.

Step S30: The MPU 21 erases the file of the original image as the object of the manipulation from the memory card 19. Note that, when the original image as the object of the manipulation has a derivative image, the MPU 21 changes the file name of this derivative image to the file name of the original image, thereby upgrading the derivative image to the original image. After such file manipulation, the MPU 21 finishes the file manipulation process routine.

Through the operations explained above, the file manipulation process is completed.

[Effect and so on of First Embodiment]

As described above, in the first embodiment, a new derivative image for transfer is generated by reducing the resolution of the original image. The MPU 21 changes the initial letter "D" of the file name of the original image to the initial letter "S" or the like for the derivative image to generate the file name of the derivative image. The original image and the derivative image are recorded on the memory card 19 in such a manner that both the images get associated with each other by the file name rule.

Therefore, by tracing back the associations by this file name rule, the file manipulation done to the original image can be automatically applied to its derivative image. As a result, the user need not separately perform file manipulation for the original image and the derivative image, which realizes saving labor taken for managing the derivative image.

Especially, in the first embodiment, in response to the erase of the original image, its corresponding derivative image is erased together. This eliminates a problem that an unnecessary derivative image continues to remain on the memory card 19 and occupies a memory space even after the original image is erased.

Further, in the first embodiment, the derivative image is erased in response to the completion of the external transfer of the derivative image. This eliminates a problem that the derivative image that has been transferred continues to remain in the electronic camera and occupies the memory space of the memory card 19.

Moreover, in the first embodiment, in response to the file transfer of the original image, its corresponding derivative image is also file-transferred. This eliminates a problem that the derivative image exists separately from the original image after the file transfer of the original image.

In addition, in the first embodiment, in accordance with the protect setting (erase prevention setting) of the original image, the protect setting is set on its corresponding derivative image. Therefore, the user need not set the protect setting separately on the original image and on the derivative image, which makes it possible to save his/her time and labor.

Further, in the first embodiment, when only the original image is erased, its corresponding derivative image is upgraded to the original image. This can prevent a disadvantage that the user does not notice the derivative image whose original image does not exist remaining on the memory card 19 and leaves it unprocessed.

Moreover, in the first embodiment, if the number of the pixels of the thumbnail image is equal to or larger than the number of the pixels of the derivative image, the thumbnail image is erased from the file of the original image. This can reduce the file size of the original image by the file size of the thumbnail image.

Next, another embodiment will be explained.

<<Second Embodiment>>

A second embodiment describes an electronic camera corresponding to the inventions of claims 1 to 13. Note that the configuration of the electronic camera in the second embodiment is the same as that in the first embodiment (FIG. 1 and FIG. 2), and therefore, the configuration description thereof will be omitted here. Further, description on the operations similar to those of the first embodiment (file manipulation to the images, suspension of thumbnail image appending, and so on) will be omitted here in order to avoid repetition.

[Relation with the Invention]

Hereinafter, the relation between the inventions and the second embodiment will be explained. Note that the relation here only illustrates one interpretation for reference, and is not intended to limit the present invention more than necessary.

An imaging unit described in the claims corresponds to an image sensor 13, a timing generator 13a, an image processing unit 14, an A/D converting unit 15, and a DSP 16.

A derivative image generating unit described in the claims corresponds to 'a function of generating a derivative image' of an MPU 21 (or the DSP 16).

A recording unit described in the claims corresponds to 'a function of file management of a memory card 19' of the MPU 21.

A transfer unit described in the claims corresponds to an interface 32.

A storage space monitoring unit described in the claims corresponds to 'a function of monitoring an available storage space of the memory card 19' of the MPU 21.

A control unit described in the claims corresponds to 'a function of erasing from the memory card 19 a derivative image which has been transferred' of the MPU 21.

[Description on Derivative Image Generating Process]

Figure 6:
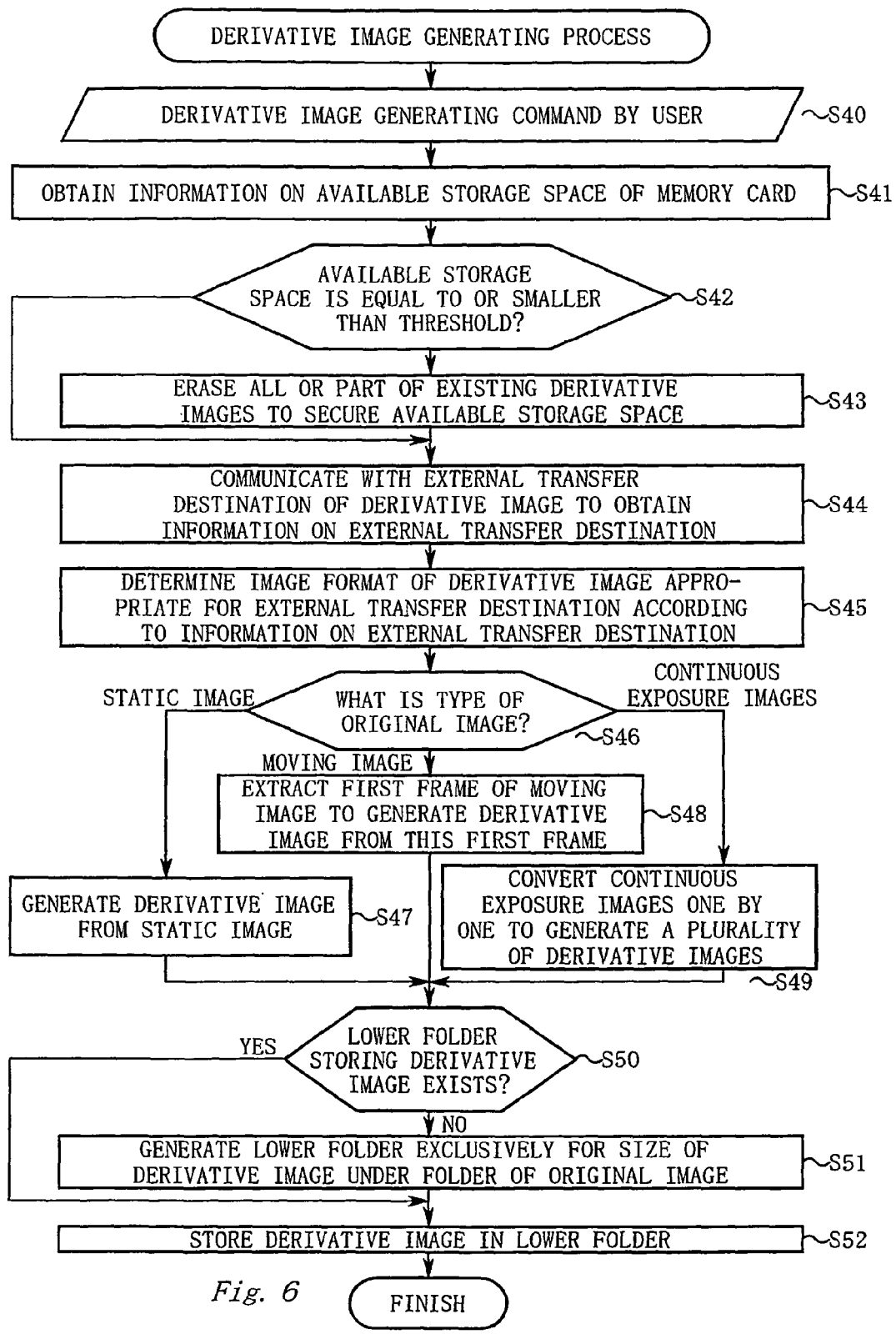
FIG. 6 is a flowchart showing a derivative image generating process in a second embodiment.

FIG. 6 is a flowchart showing a derivative image generating process characterizing the second embodiment.

Hereinafter, the derivative image generating process will be explained following the steps shown in FIG. 6.

Step S40: A user first operates a cross button 23, similarly to the first embodiment, to give a derivative image generating command to the MPU 21.

Step S41: The MPU 21 obtains information on an available storage space of the memory card 19.

Step S42: The MPU 21 determines whether or not the available storage space of the memory card 19 is large enough to store a derivative image.

When the available storage space is too small to store the derivative image here, the MPU 21 shifts its operation to Step S42.

On the other hand, when the available storage space is large enough to store the derivative image, the MPU 21 shifts its operation to Step S43.

Step S43: The MPU 21 erases from the memory card 19 a part or all of existing derivative images to secure a memory space in the memory card 19.

Step S44: The MPU 21 communicates with an external transfer destination via the interface 32 to obtain information on the external transfer destination (incidentally, information on what kind of device the external transfer destination is may also be obtained through a user's input).

Step S45: The MPU 21 determines an image format (for example, image size, a screen aspect ratio, the number of colors, and so on) of the derivative image appropriate for the external transfer destination in accordance with the information on the external transfer destination.

Step S46: The MPU 21 determines the type of an original image from which the derivative image is generated.

When the original image is a one-frame image captured in a single-shot capture mode here, the MPU 21 shifts its operation to Step S47.

When the original image is constituted of moving images captured in a moving image capture mode, the MPU 21 shifts its operation to Step S48.

On the other hand, when the original image is a group of static images captured in a continuous capture mode, the MPU 21 shifts its operation to Step S49.

Step S47: The MPU 21 converts the original image (the one-frame static image here) to the image format determined in Step S45 to generate the derivative image. After this operation, the MPU 21 shifts its operation to Step S50.

Step S48: The MPU 21 extracts a first frame of the original image (the moving images here). The MPU 21 converts this first frame into the image format determined in Step S45 to generate the derivative image. After this operation, the MPU 21 shifts its operation to Step S50.

Step S49: The MPU 21 converts each frame of the original image (the plural static images here) into the image format determined in Step S45 to generate the plural derivative images. After this operation, the MPU 21 shifts its operation to Step S50.

Step S50: The MPU 21 determines whether or not a lower folder corresponding to the image size of the derivative image exists in a folder of the original image.

When the lower folder does not exist here, the MPU 21 shifts its operation to Step S51.

On the other hand, when the lower folder exists, the MPU 21 shifts its operation to Step S52.

Step S51: The MPU 21 makes a lower folder exclusively for the image size of the derivative image under a hierarchy of the original image folder in the memory card 19.

Step S52: The MPU 21 stores a file of the derivative image in the lower folder exclusively for the image size.

Through the above-described operations, the derivative image generating process is completed.

[Effect and so on of Second Embodiment]

In the second embodiment, the same effect as that in the first embodiment is obtainable as described above.

In addition, in the second embodiment, the lower folder is made for each image size of the derivative image in the folder of the original image, and the derivative images are stored therein, being classified by the image size. This enables efficient image management of the original images and the derivative images based on the hierarchical folders.

Further, in the second embodiment, the image format appropriate for the external transfer destination is determined based on the information on the external transfer destination, and the derivative image is generated so as to conform to the image format. Consequently, the user need not change the image format or the like for every external transfer destination. Moreover, a suitable derivative image for the external transfer destination can be surely generated.

Moreover, in the second embodiment, all or a part of the derivative images are erased when the memory card 19 does not have a sufficient available storage space. In this case, a shortage in the available storage space is compensated by the file space of the erased derivative images, so that it is made possible to increase the number of recordable frames of the electronic camera with efficiency.

Note that when the memory card 19 does not have an available storage space large enough to store a captured original image, a part or all of the derivative images may be erased. In this case, it is possible to secure the storage space for the original image.

<<Third Embodiment>>

A third embodiment is an embodiment of an electronic camera corresponding to the inventions of claims 14 and 18.

Note that the configuration of the electronic camera in the third embodiment is the same as that in the first embodiment (FIG. 1 and FIG. 2), and therefore, the configuration description thereof will be omitted here.

[Relation with the Invention]

Hereinafter, the relation between the invention and the third embodiment will be explained. It should be noted that the relation here only illustrates one interpretation for reference and is not intended to limit the present invention more than necessary.

An imaging unit described in the claims corresponds to an image sensor 13, a timing generator 13a, an image processing unit 14, an A/D converting unit 15, and a DSP 16.

A derivative image generating unit described in the claims corresponds to 'a function of generating a derivative image' of an MPU 21 (or the DSP 16).

A transfer unit described in the claims corresponds to an interface 32.

A display unit described in the claims corresponds to the MPU 21 and a liquid crystal display unit 31.

[Description on Operation of Full Screen Display Mode]

Figure 7:
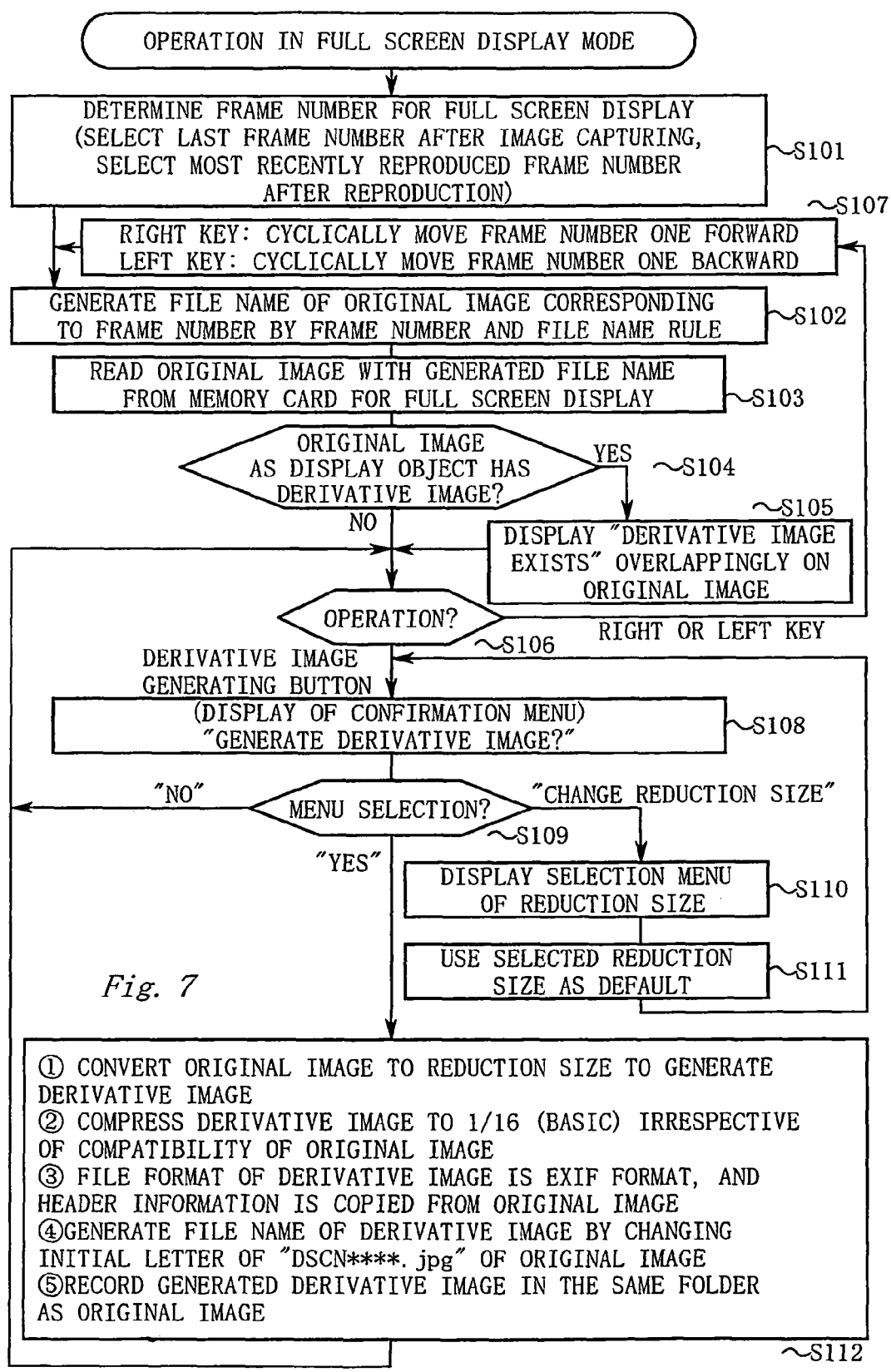
FIG. 7 is a flowchart explaining the operation performed in a full screen display mode in a third embodiment.

FIG. 7 is a flowchart explaining the operation performed in a full screen display mode in the third embodiment. Hereinafter, the operation in the full screen display mode will be explained following the steps in FIG. 7.

Step S101: A user turns a command dial 25 first to select a reproduction mode. The user further operates a display switch button 27 as required to select the full screen display mode.

When the full screen display mode is thus selected, the MPU 21 selects a frame number for the full screen display.

After image capturing, for example, the MPU 21 selects the last frame number (in other words, a frame number captured most recently) as the frame number for the full screen display.

After image reproduction, for another example, the MPU 21 selects a most recently reproduced frame number as the frame number for the full screen display.

Step S102: The MPU 21 generates a file name of an original image corresponding to the selected frame number based on the selected frame number and a file name rule.

When the file name rule of original images is, for example, "DSCN**.jpg", the MPU 21 inserts the frame number in the serial number "**" to generate the file name of the original image.

Step S103: The MPU 21 reads out a compressed file of the original image from a memory card 19 based on the generated file name and stores this compressed file in a buffer memory 18. After expanding this compressed file, the DSP 16 converts the resolution thereof according to the screen size of the liquid crystal display unit 31 and stores this converted file in a frame memory 30. The liquid crystal display unit 31 displays on the full screen the original image (the one converted in accordance with the screen size of a monitor screen) in this frame memory 30.

Step S104: The MPU 21 determines whether or not the displayed original image has a derivative image for transfer.

When a file name rule of derivative images is, for example, "SSCN**.jpg", the MPU 21 changes an initial letter of the file name of the original image from "D" to "S" to generate a file name of the derivative image. The MPU 21 searches the memory card 19** for this file name of the derivative image to determine whether or not the original image has the derivative image.

When the original, image has the derivative image here, the MPU 21 shifts its operation to Step S105.

On the other hand, when the corresponding derivative image does not exist, the MPU 21 shifts its operation to Step S106.

Figure 9:
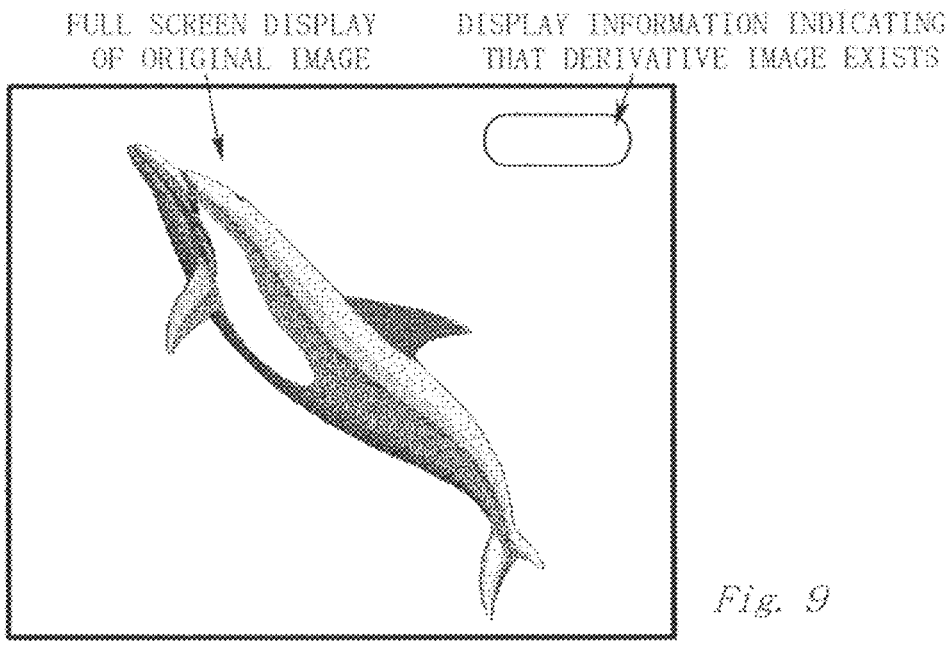
FIG. 9 is a view showing a display screen image in the full screen display mode.

Step S105: The MPU 21 overlappingly displays an information display indicating that "a derivative image exists" as shown in FIG. 9 on the liquid crystal display unit 31 via the frame memory 30.

After such information display, the MPU 21 shifts its operation to Step S106.

Step S106: The MPU 21 waits for a user's key operation with this full screen display on (FIG. 9).

When the user presses down a left key 23*c* or a right key 23*d* here, the MPU 21 shifts its operation to Step S107.

On the other hand, when the user presses down a derivative image generating button 29, the MPU 21 shifts its operation to Step S108.

Step S107: If the right key 23*d* is pressed down here, the MPU 21 cyclically moves the frame number for the full screen display one forward.

On the other hand, if the left key 23*c* is pressed down, the MPU 21 cyclically moves the frame number for the full screen display one backward.

After thus changing the frame number, the MPU 21 shifts its operation back to Step S102.

Step S108: The MPU 21 displays the following confirmation menu overlappingly on a display image on the liquid crystal display unit 31.

Header "Generate a derivative image?"
Option ① Yes (default option)
Option ② No
Option ③ Change reduction size Step S109: The MPU 21 monitors the user's operation to a cross button 23 to receive the selection from the above options ① to ③.

Specifically, the user hits the right key 23*d* once, determining the selection of the option ①. In this case, the MPU 21 shifts its operation to Step S112.

The user hits the right key 23*d* once after hitting a down key 23*b* once, determining the selection of the option ②. In this case, the MPU 21 cancels generating a new derivative image and shifts its operation back to Step S106.

On the other hand, the user hits the right key 23*d* once after hitting the down key 23*b* twice, determining the selection of the option ③. In this case, the MPU 21 shifts its operation to Step S110.

Step S110: The MPU 21 additionally displays the following confirmation menu on the display image on the liquid crystal display unit 31.

Header "Change reduction size"
Option ① 640×480 (default at the shipping time)
Option ② 320×240
Option ③ 160×120
Option ④ 96×72

Step S111: The MPU 21 monitors the user's operation to the cross button 23 to receive the selection of the image size (reduction size) of the derivative image. The MPU 21 uses the image size selected here as a default thereafter. After this operation, the MPU 21 shifts its operation back to Step S108.

Step S112: The MPU 21 reads out from the memory card 19 the compressed file of the original image currently displayed on the liquid crystal display unit 31 to store this compressed file in the buffer memory 18. The DSP 16 expands this compressed file to develop the original image in the buffer memory 18 (incidentally, when the expanded image in Step S103 still exists in the buffer memory 18, this expanded image is preferably used to omit the original image expanding operation).

The MPU 21 (or the DSP 16) converts the resolution of the original image in this buffer memory 18 to the default image size to generate a derivative image.

The DSP 16 compresses this derivative image to, for example, about $1/16$ irrespective of the compressibility of the original image.

The MPU 21 copies header information of the original image and appends it to compressed data of the derivative image to generate a compressed file in an EXIF format.

Further, the MPU 21 replaces the initial letter of the file name "DSCN****.jpg" of the original image with a letter (for example, "S" or the like) according to the image size, and the resultant file name is defined as a file name of the derivative image.

The MPU 21 records the file of thus completed derivative image in the same folder as the original image in the memory card 19.

After this operation, the MPU 21 shifts its operation back to Step S106.

Through a series of the operations explained above, the full screen display is carried out.

[Description on Operation of Thumbnail Display Mode]

Figure 8:
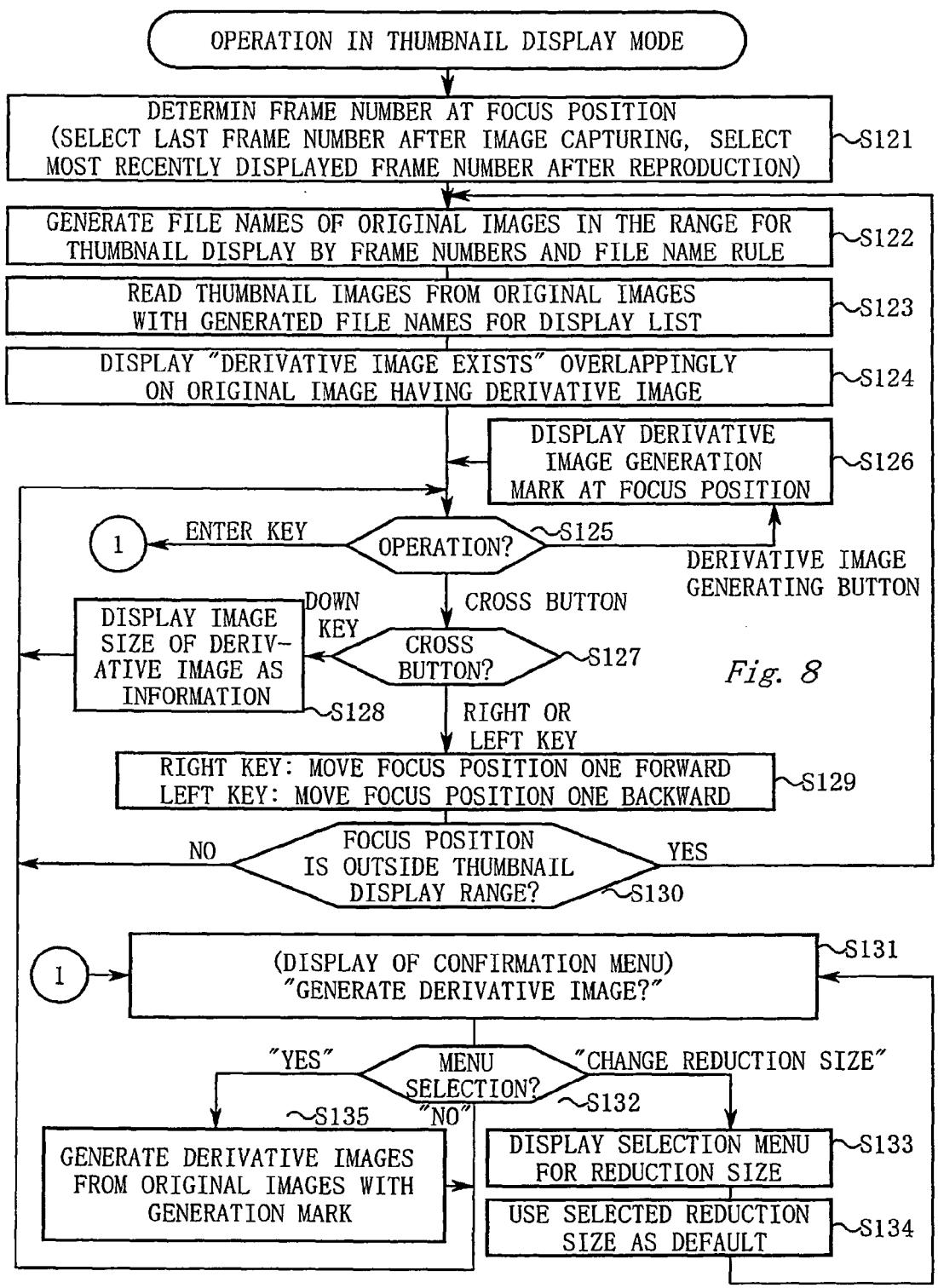
FIG. 8 is a flowchart explaining the operation performed in a thumbnail display mode.

FIG. 8 is a flowchart explaining the operation performed in a thumbnail display mode.

Next, the operation in the thumbnail display mode will be explained following the steps in FIG. 8.

Step S121: The user turns the command dial 25 first to select the reproduction mode. The user further operates the display switch button 27 if necessary to select the thumbnail display mode.

When the thumbnail display mode is thus selected, the MPU 21 decides a frame number at a focus position (an original image for focus selected from a group of thumbnail-displayed images).

After image capturing, for example, the MPU 21 selects the last frame number (namely, a frame number most recently captured) as the frame number at the focus position.

After image reproduction, for another example, the MPU 21 selects a most recently reproduced frame number as the frame number at the focus position.

Step S122: Based on the selected frame number and the file name rule, file names of the group of the original images for the thumbnail display are generated.

Step S123: The MPU 21 retrieves these file names from the memory card 19 and sequentially reads out the thumbnail images each stored in a header of each file. The MPU 21 displays these thumbnail images as a list on the liquid crystal display unit 31 via the frame memory 30.

Figure 10:
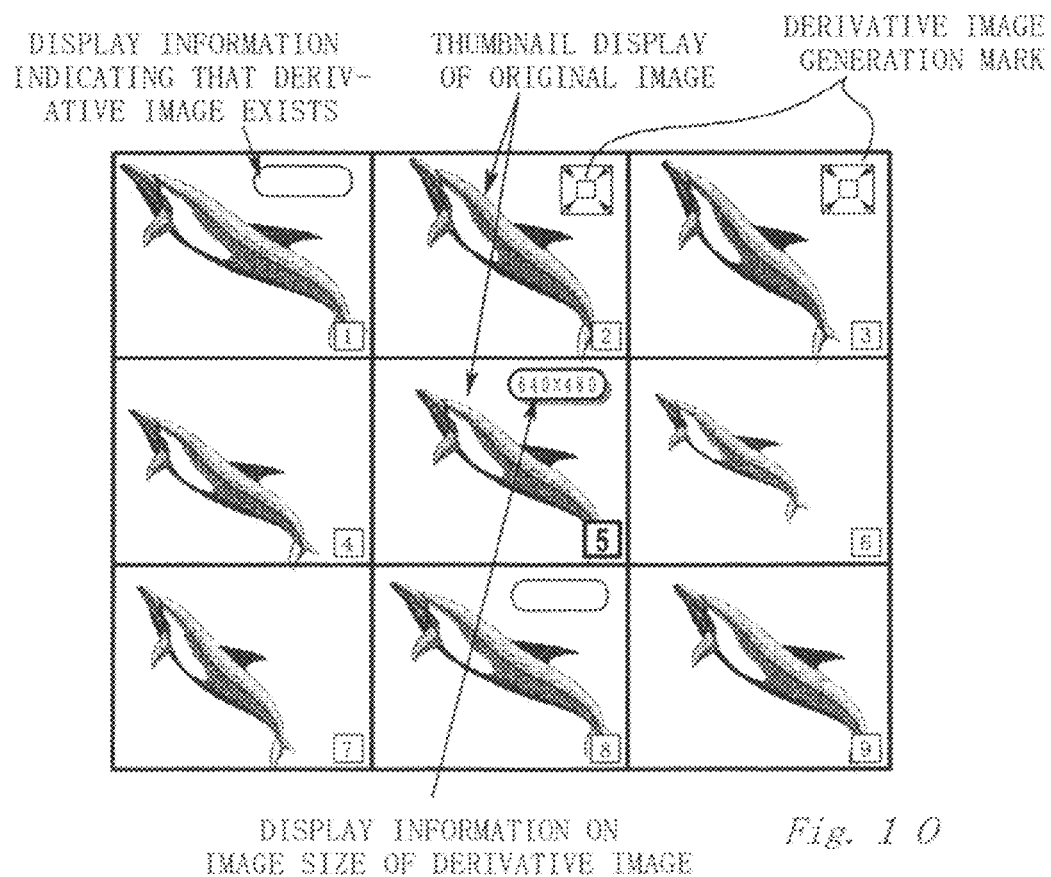
FIG. 10 is a view showing a display screen image in the thumbnail display mode.

Step S124: The MPU 21 determines whether or not each of the original images on the screen has a derivative image based on the file name rule. The MPU 21 displays information indicating that "a derivative image exists" on the thumbnail image corresponding to the original image having the derivative image, as shown in FIG. 10.

Step S125: The MPU 21 waits for a user's key operation with this thumbnail display on.

If the user presses down the derivative image generating button 29 here, the MPU 21 shifts its operation to Step S126.

Meanwhile, when the user presses down a cross button 23, the MPU 21 shifts its operation to Step S127.

When the user presses down an enter key, the MPU 21 shifts its operation to Step S131.

Step S126: In case where the derivative image generating button 29 is pressed down here, the MPU 21 displays a derivative image generation mark on each of the thumbnail images at the focus positions, as shown in FIG. 10. Further, the MPU 21 adds the frame number of this focus position in a derivative image generation schedule list which is prepared on an internal memory. After this operation, the MPU 21 shifts its operation back to Step S125.

Step S127: The MPU 21 determines the user's operation to the cross button 23.

If the user presses the down key 23b down here, the MPU 21 shifts its operation to Step S128.

On the other hand, when the user presses down the left key 23c or the right key 23d, the MPU 21 shifts its operation to Step S129.

Step S128: The MPU 21 searches for the derivative image of the original image at the focus position, and displays as information image size of this derivative image on the thumbnail image at the focus position (refer to FIG. 10).

Note that when the original image at the focus position has a plurality of derivative images, the MPU 21 displays the image sizes of the derivative images in sequence every time the down key 23b is pressed down.

After this operation, the MPU 21 shifts its operation back to Step S125.

Step S129: When the right key 23d is pressed down, the MPU 21 moves the focus position forward by one frame.

On the other hand, when the left key 23c is pressed down, the MPU 21 moves the focus position backward by one frame.

Step S130: In accordance with such shift in the focus position, the MPU 21 determines whether or not the focus position shifts to the outside of a thumbnail display range.

When the focus position shifts within the thumbnail display range here, the MPU 21 shifts its operation back to Step S125.

On the other hand, when the focus position shifts to the outside of the thumbnail display range, the MPU 21 shifts its operation back to Step S122 and updates the thumbnail display.

Step S131: When the enter key 29a is pressed down, the MPU 21 overlappingly displays the following confirmation menu on the liquid crystal display unit 31.

Header "Generate a derivative image?"
Option ① Yes (default option)
Option ② No
Option ③ Change reduction size Step S132: The MPU 21 monitors the user's operation to the cross button 23 to receive the selection from the above options ① to ③.

When the option ① is selected here, the MPU 21 shifts its operation to Step S135.

When the option ② is selected, the MPU 21 cancels generating a new derivative image and shifts its operation back to Step S125.

On the other hand, when the option ③ is selected, the MPU 21 shifts its operation to Step S133.

Step S133: The MPU 21 additionally displays the following confirmation menu on the display image on the liquid crystal display unit 31.

Header "Change reduction size"
Option ① 640×480 (default at the shipping time)
Option ② 320×240
Option ③ 160×120
Option ④ 96×72

Step S134: The MPU 21 monitors the user's operation to the cross button 23 to receive the selection of the image size (reduction size) of the derivative image. The MPU 21 uses the image size selected here as a default thereafter. After this operation, the MPU 21 shifts its operation back to Step S131.

Step S135: The MPU 21 sequentially generates the derivative images from the original images with the generation mark (the original images listed in the derivative image generation schedule list) and sequentially records these derivative images in the memory card 19.

After this operation, the MPU 21 shifts its operation back to Step S125.

[Effect and so on of Third Embodiment]

As described above, in the third embodiment, the original image and the derivative image are discriminated based on the file name rule and only the original image is displayed on the liquid crystal display unit 31. This makes it possible to surely prevent the user from being confused at image management since there is no case where the original image and the derivative image being the same image are displayed together.

Further, only the original image is an object of display so that the number of images to be displayed is decreased.

This enables the user to quickly find a target image (picture) from a small number of images.

Moreover, also in the thumbnail display mode, only the original images are displayed and thus the original images and the derivative images are not displayed concurrently on the screen. This can surely prevent the user from being confused at the image management because the original image and the derivative image being the same image are both present on the screen.

Next, another embodiment will be explained.

<<Fourth Embodiment>>

A fourth embodiment is an embodiment of an electronic camera corresponding to the inventions of claims 15 to 19.

Note that the configuration of the electronic camera in the fourth embodiment is the same as that in the third embodiment (FIG. 1 and FIG. 2), and therefore, the configuration description thereof will be omitted here. Further, description on the same operations as those of the third embodiment (the operation in the thumbnail display mode and so on) will be also omitted in order to avoid repeated description.

[Relation with the Invention]

Hereinafter, the relation between the inventions and the fourth embodiment will be explained. It should be noted that the relation here only illustrates one interpretation for reference and is not intended to limit the present invention more than necessary.

An imaging unit described in the claims corresponds to an image sensor 13, a timing generator 13a, an image processing unit 14, an A/D converting unit 15, and a DSP 16.

A derivative image generating unit described in the claims corresponds to 'a function of generating a derivative image' of an MPU 21 (or the DSP 16).

A transfer unit described in the claims corresponds to an interface 32.

A display unit described in the claims corresponds to the MPU 21 and a liquid crystal display unit 31.

A slide display unit described in the claims corresponds to the MPU 21 and the liquid crystal display unit 31.

[Description on Operation of Full Screen Display Mode]

Figure 11:
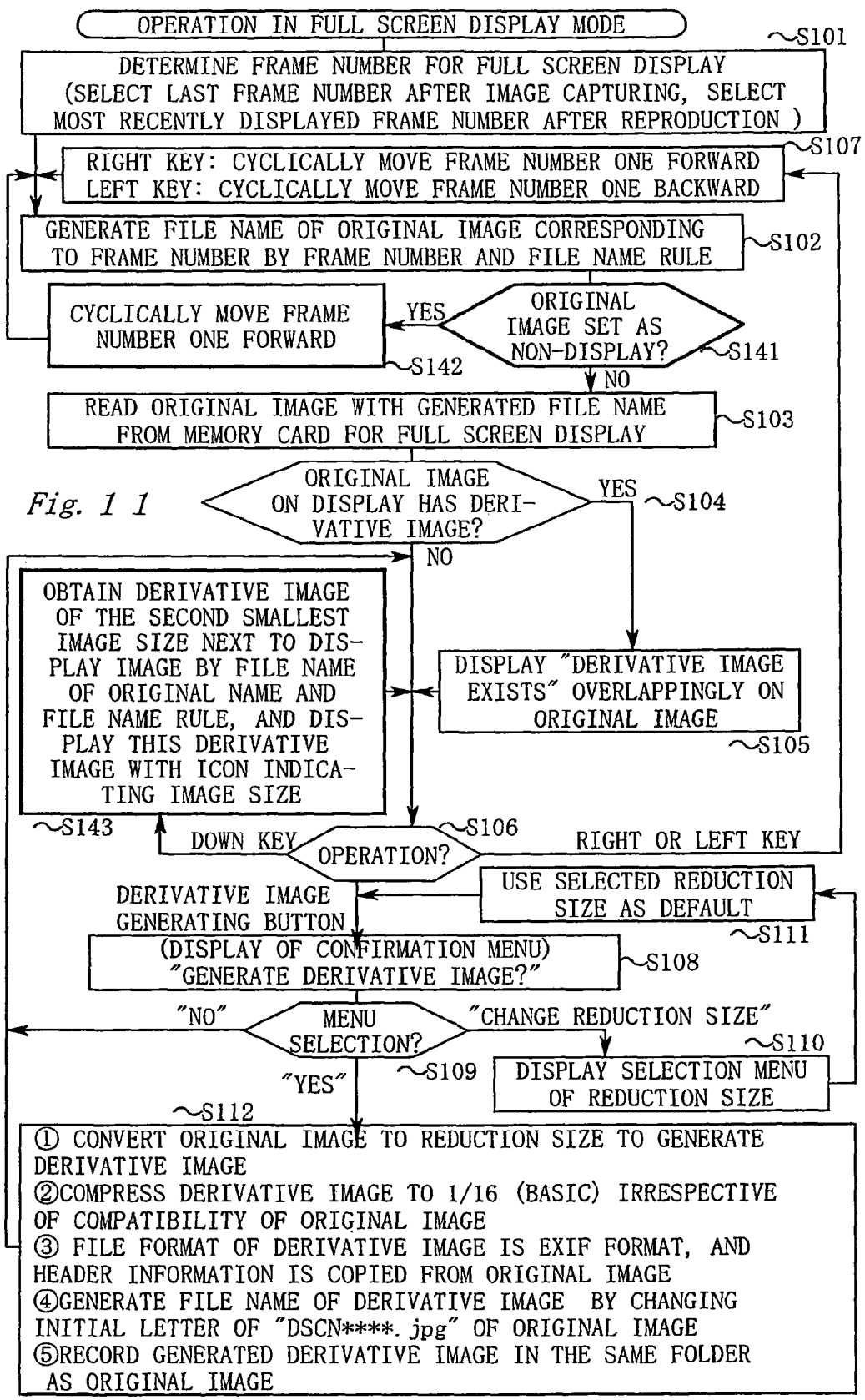
FIG. 11 is a flowchart explaining the operation performed in a full screen display mode in a fourth embodiment.

FIG. 11 is a flowchart explaining the operation performed in a full screen display mode in the fourth embodiment. In this FIG. 11, the same step numbers are assigned to the same operations as those in the third embodiment (FIG. 7), and repeated description thereof will be omitted here.

The operation in the full screen display mode shown in FIG. 11 is characterized in that Steps S141 to S143 are newly added. Hereinafter, this added part will be explained.

Step S141: The MPU 21 reads out from a memory card 19 a file property of an original image which is to be displayed, and determines whether or not this original image is set as non-display.

When the original image is set as non-display here, the MPU 21 shifts its operation to Step S142.

On the other hand, when the original image is not set as non-display (when the display thereof is permitted), the MPU 21 shifts its operation to Step S103.

Step S142: The MPU 21 cyclically moves a frame number which is to be displayed, by one frame forward and so controls that the original image (and a derivative image) set as non-display is not displayed on the screen. After this operation, the MPU 21 shifts its operation back to Step S102.

Figure 12:
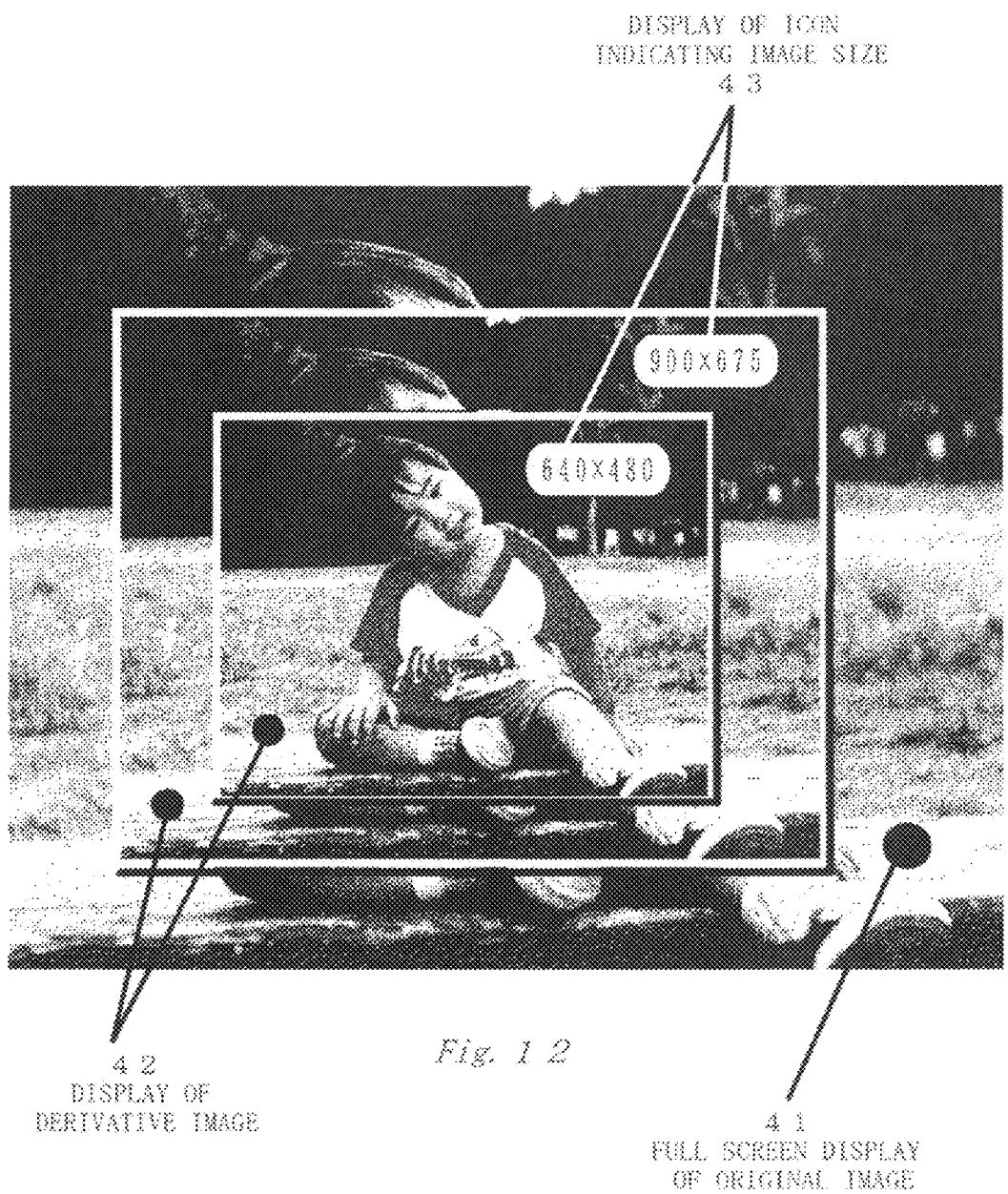
FIG. 12 is a view showing a display screen image in the full screen display mode.

Step S143: When a down key 23b is pressed down in Step S106, the MPU 21 replaces an initial letter of a file name "DSCN****.jpg" of the original image with a letter (for example, "S" or the like) according to the image size to generate a file name of the derivative image. The MPU 21 searches the memory card 19 for this derivative image. Upon finding this derivative image, the MPU 21 reads out this derivative image from the memory card 19, and displays a display 42 of this derivative image overlappingly on a full screen display 41 of the original image, as shown in FIG. 12. At this time, the MPU 21 also displays an icon 43 as information showing the image size of this derivative image.

Note that when the down key 23b is pressed down a plurality of times, the MPU 21 sequentially displays a plurality of derivative images in the descending order of the image size. FIG. 12 shows a state in which the plural derivative images are displayed by this operation in a nesting way.

[Description on Operation of Slide Display Mode]

Figure 13:
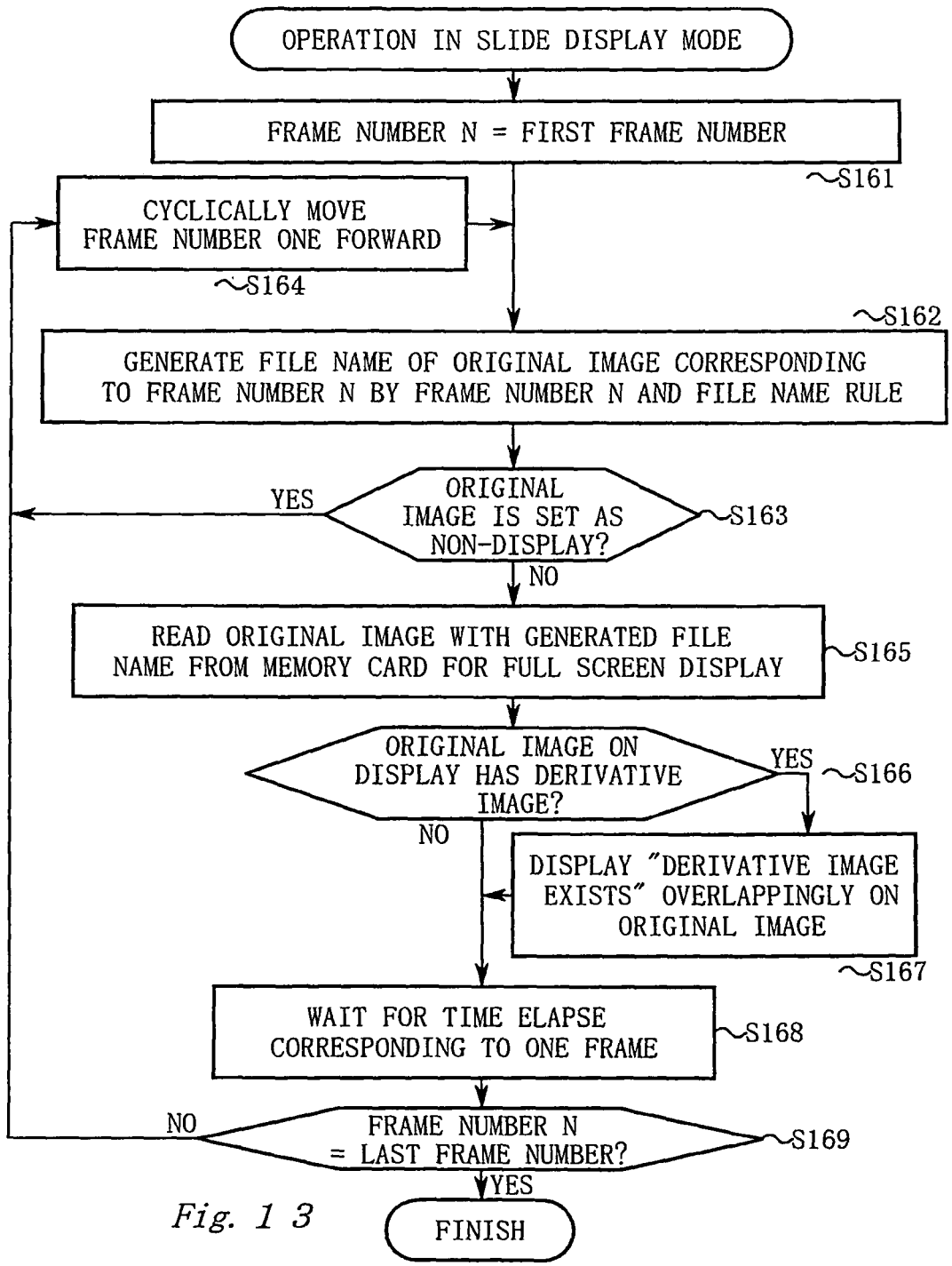
FIG. 13 is a flowchart explaining the operation performed in a slide display mode in the fourth embodiment.

FIG. 13 is a flowchart explaining the operation performed in a slide display mode in the fourth embodiment. Hereinafter, the operation in the slide display mode will be explained following the steps in FIG. 13.

Step S161: A user first turns a command dial 25 to select a reproduction mode. The user further operates a display switch button 27 as required to select the slide display mode.

When the slide display mode is thus selected, the MPU 21 selects an initial frame number of slide display from the memory card 19, and substitutes this frame number in a frame number N.

Step S162: A file name of the original image corresponding to the frame number N is generated based on the frame number N and a file name rule.

When the file name rule of original images is, for example, "DSCN**.jpg", the MPU 21 inserts the frame number in the serial number "**" to generate the file name of the original image.

Step S163: The MPU 21 obtains information on a file property from the memory card 19 based on the generated file name of the original image and determines whether or not the original image is set as non-display.

When the original image is set as non-display here, the MPU 21 shifts its operation to Step S164.

On the other hand, the original image is not set as non-display (when the display thereof is permitted), the MPU 21 shifts its operation to Step S165.

Step S164: The MPU 21 moves the frame number to be displayed by one frame forward cyclically and so controls that the original image set as non-display is not displayed on the screen. After this operation, the MPU 21 shifts its operation back to Step S162.

Step S165: The MPU 21 reads out a compressed file of the original image from the memory card 19 based on the generated file name of the original image and stores this compressed file in a buffer memory 18. After expanding this compressed file, the DSP 16 converts the resolution thereof according the screen size of the liquid crystal display unit 31 and stores the converted file in a frame memory 30. The liquid crystal display unit 31 displays the original image (the one converted according to the screen size of a monitor screen) stored in this frame memory 30.

Step S166: The MPU 21 determines whether or not the original image on display has a derivative image for transfer.

When the original image on display has the derivative image here, the MPU 21 shifts its operation to Step S167.

On the other hand, when the original image on display does not have the derivative image, the MPU 21 shifts its operation to Step S168.

Step S167: The MPU 21 overlappingly displays an information display indicating that "a derivative image exists" on the liquid crystal display unit 31 via the frame memory 30. After such information display, the MPU 21 shifts its operation to Step S168.

Step S168: The MPU 21 waits for the elapse of a slide display time corresponding to one frame and shifts its operation to Step S169.

Step S169: The MPU 21 determines whether or not the current frame number N is the last frame number in the memory card 19.

When the current frame number N is different from the last frame number, the MPU 21 shifts its operation back to Step S164.

On the other hand, when the current frame number N is the last frame number, the slide display operation is finished.

[Effect and so on of Fourth Embodiment]

As described above, in the fourth embodiment, the information display on the image size of the derivative image is displayed as shown in FIG. 12. This enables a user to appropriately distinguish the original image and the derivative image being the same image based on the information on the image size.

Further, in the fourth embodiment, when the down key 23b is pressed down while the original image is displayed on the full screen, the derivative images are displayed in the descending order of the image size. In this case, the user can appropriately distinguish the original image and the derivative image based on the display order.

Moreover, in the fourth embodiment, when the original image is set as non-display, the derivative image is also set as non-display together with the original image. Therefore, the user need not separately set the derivative image as non-display, which can save the user's time and labor.

Further, in the fourth embodiment, the original image and the derivative image are discriminated based on the file name rule and only the original image is displayed in the slide display mode. Therefore, the original image and the derivative image being the same image are not redundantly and repeatedly displayed, which enables the user to look through a series of images in as short a time as possible.

<<Fifth Embodiment>>

A fifth embodiment is an embodiment of an electronic camera corresponding to the inventions of claims 20 to 24.

Note that since the configuration of the electronic camera in the fifth embodiment is the same as that in the first embodiment (FIG. 1 and FIG. 2), the configuration description thereof will be omitted here.

[Relation with the invention]

Hereinafter, the relation between the inventions and the fifth embodiment will be explained. It should be noted that the relation here only illustrates one interpretation for reference and is not intended to limit the present invention more than necessary.

An imaging unit described in the claims corresponds to an image sensor 13, a timing generator 13a, an image processing unit 14, an A/D converting unit 15, and a DSP 16.

A derivative image generating unit described in the claims corresponds to "a function of generating a derivative image" of an MPU 21 (or the DSP 16).

A transfer setting unit described in the claims corresponds to 'a function of setting a flag on an image' of the MPU 21.

A transfer unit described in the claims corresponds to an interface 32.

An erase unit described in the claims corresponds to "a function of erasing an image in a memory card 19" of the MPU 21.

[User Interface in Full Screen Display Mode]

Figure 14:
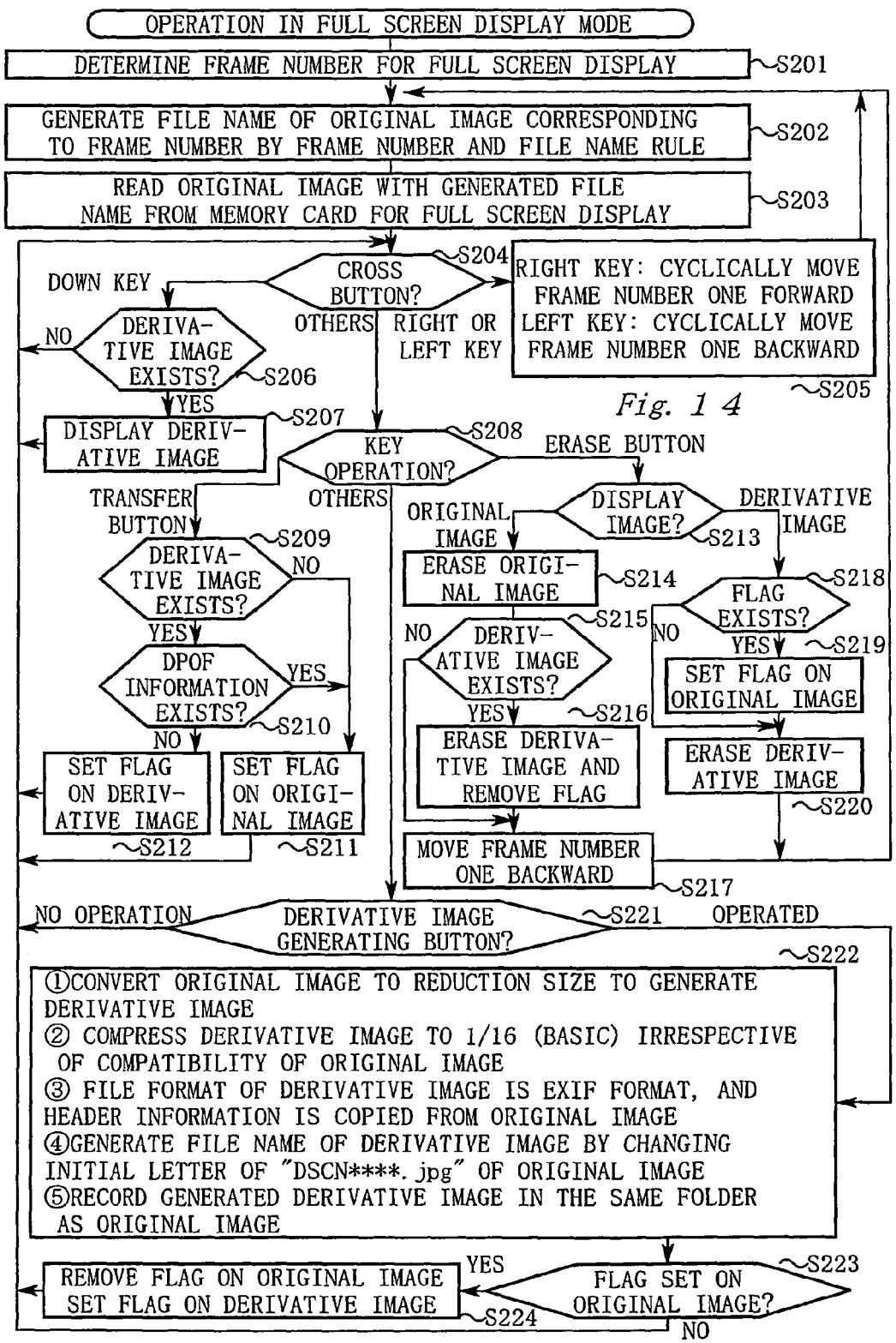
FIG. 14 is a flowchart explaining the operation performed in a full screen display mode.

FIG. 14 is a flowchart explaining the operation performed in a full screen display mode in the fifth embodiment. Hereinafter, the operation in the full screen display mode will be explained following the steps in FIG. 14.

Step S201: A user first turns a command dial 25 of an electronic camera 11 to select a reproduction mode. The user further operates a display switch button 27 as required to select the full screen display mode.

When the full screen display mode is thus selected, the MPU 21 selects a frame number of an image for the full screen display.

After image capturing, for example, the MPU 21 selects the last frame number (namely, a frame number most recently captured) as the frame number for the full screen display.

After the image reproduction, for example, the MPU 21 selects a most recently reproduced frame number as the frame number for the full screen display.

Step S202: The MPU 21 generates a file name of an original image corresponding to the selected frame number based on the selected frame number and a file name rule.

When the file name rule of original images is, for example, "DSCN:**.jpg", the MPU 21 inserts the frame number in place of the serial number "**" to generate the file name of the original name.

Step S203: The MPU 21 reads out a compressed file of the original image from the memory card 19 based on the generated file name and stores this compressed file in a buffer memory 18. After expanding this compressed file, the DSP 16 converts the resolution according to the screen size of a liquid crystal display unit 31, and stores this converted file in a frame memory 30. The liquid crystal display unit 31 displays on the full screen the original image (the one converted in accordance with the screen size of a monitor screen) stored in this frame memory 30.

Step S204: With this full screen display, the MPU 21 determines a key operation to a cross button 23 by a user.

When the user presses down a left key 23c or a right key 23d here, the MPU 21 shifts its operation to Step S205.

When the user presses down a down key 23b, the MPU 21 shifts its operation to Step S206.

In other cases, the MPU 21 shifts its operation to Step S208.

Step S205: When the right key 23d is pressed down, the MPU 21 moves the frame number for the full screen display one forward cyclically.

On the other hand, when the left key 23c is pressed down, the MPU 21 moves the frame number for the full screen display one backward cyclically.

After thus changing the frame number, the MPU 21 shifts its operation back to Step S202.

Step S206: The MPU 21 determines whether or not the original image on display has a derivative image.

When a file name rule of derivative images is, for example, "SSCN****.jpg", the MPU 21 changes an initial letter of the file name of the original image from "D" to "S" to generate a file name of the derivative image. The MPU 21 searches the memory card 19 for this file name of the derivative image, thereby judging whether or not the original image has the derivative image.

When the original image has the derivative image here, the MPU 21 shifts its operation to Step S207.

On the other hand, the corresponding derivative image does not exist, the MPU 21 shifts its operation back to Step S204.

Step S207: The MPU 21 reads out from the memory card 19 the derivative image which is generated from the original image on display. The MPU 21 displays a display 42 of this derivative image overlappingly on a full screen display 41 of the original image, as shown in FIG. 12. At this time, the MPU 21 also displays as information an icon 43 indicating the image size of this derivative image together.

Note that when the down key 23*b* is pressed down a plurality of times, the MPU 21 sequentially displays a plurality of derivative images in the descending order of the image size. FIG. 12 shows a state in which the plural derivative images are displayed by this operation in a nesting way.

After this display operation to the derivative image, the MPU 21 shifts its operation back to Step S204.

Step S208: Further, the MPU 21 determines other user's key operations.

When the MPU 21 recognizes the key operation to a transfer button 28 here, the MPU 21 shifts its operation to Step S209.

When the MPU 21 recognizes the key operation to an erase button 29*b*, the MPU 21 shifts its operation to Step S213.

In other cases, the MPU 21 shifts its operation to Step S221.

Step S209: The MPU 21 determines whether or not the original image on display has a derivative image.

When the original image has the derivative image here, the MPU 21 shifts its operation to Step S210.

On the other hand, when the corresponding derivative image does not exist, the MPU 21 shifts its operation to Step S211.

Step S210: The MPU 21 determines whether or not the original image on display has any print information (specification of a frame to be printed, the number of sheets to be printed, and so on) specified in DPOF (abbreviation of Digital Print Order Format) and the like.

When the original image on display has the print information, the MPU 21 shifts its operation to Step S211.

On the other hand, when the original image on display does, not have any print information, the MPU 21 shifts its operation to Step S212.

Step S211: The MPU 21 sets a flag on the original image on display. This flag is set in such a manner, for example, that the MPU 21 writes information indicating a transfer candidate in a header or the like of an image file. Another example of how the flag is set is that the MPU 21 adds an identifier (file name or the like) of the image to a transfer candidate list on an internal memory.

After the setting operation, the MPU 21 shifts its operation back to Step S204.

Step S212: The MPU 21 sets the flag not on the original image on display but on the derivative image that the original image has.

After this setting operation, the MPU 21 shifts its operation back to Step S204.

Step S213: The MPU 21 determines whether or not the derivative image is displayed on the screen.

When the derivative image is displayed here as shown in FIG. 12, the MPU 21 shifts its operation to Step S218.

On the other hand, when only the original image is displayed on the screen, the MPU 21 shifts its operation to Step S214.

Step S214: The MPU 21 erases the original image on display from the memory card 19.

Step S215: The MPU 21 determines whether or not the erased original image had a derivative image.

When the erased original image had the derivative image here, the MPU 21 shifts its operation to Step S216.

On the other hand, when the erased original image does not have the derivative image, the MPU 21 shifts its operation to Step S217.

Step S216: The MPU 21 erases the derivative image that the original image had. Further, when the flag has been set on this derivative image, the MPU 21 removes the flag.

Note that when the flag is set as information in the header of the image file, removal of this flag is done concurrently with the file erase of the derivative image. Also, when setting the flag is managed according to the transfer candidate list on the internal memory of the MPU 21, the removal of the flag is done at the same time as the identifier of an image as a transfer candidate is removed from this transfer candidate list.

Step S217: The MPU 21 moves the frame number of the original image to be displayed by one frame backward in accordance with the erase of the original image. Thereafter, the MPU 21 shifts its operation back to Step S202 and updates the full screen display.

Step S218: The MPU 21 determines whether or not a flag is set on the derivative image displayed on the utmost front window of the screen.

When this derivative image has the flag set here, the MPU 21 shifts its operation to Step S219.

On the other hand, when this derivative image does not have the flag set, the MPU 21 shifts its operation to Step S220.

Step S219: The MPU 21 sets the flag on the original image from which this derivative image is generated. Note that when one original image has a plurality of derivative images, the MPU 21 sets the flag on a derivative image having the second largest image size next to the derivative image displayed on the utmost front window.

Step S220: The MPU 21 erases from the memory card 19 the derivative image displayed on the utmost front window. Further, in a case where this derivative image has a flag, the MPU 21 removes the flag at the same time.

After this operation, the MPU 21 shifts its operation back to Step S202 and updates the full screen display.

Step S221": The MPU 21 determines a key operation to a derivative image generating button 29 by a user.

When the MPU 21 recognizes the user's key operation to the derivative image generating button 29 here, the MPU 21 shifts its operation to Step S222.

On the other hand, when the MPU 21 does not recognize the key operation to the derivative image generating button 29, the MPU 21 shifts its operation back to Step S204.

Step S222: The MPU 21 reads out from the memory card 19 the compressed file of the original image currently displayed and stores this compressed file in the buffer memory 18. The DSP 16 expands this compressed file to develop the original image stored in the buffer memory 18 (incidentally, when the expanded image in Step S203 still exists in the buffer memory 18, it is preferable to use this image, thereby omitting the original image expanding operation).

The MPU 21 (or the DSP 16) converts the resolution of this original image in the buffer memory 18 to generate a derivative image.

The DSP 16 compresses this derivative image to, for example, about $1/16$ irrespective of the compressibility of the original image.

The MPU 21 copies header information of the original image and appends it to compressed data of the derivative image to generate a compressed file in an EXIF format.

Further, the MPU 21 replaces the initial letter of the file name "DSCN****.jpg" of the original image with a letter (for example, "S" or the like) according to the image size to generate a file name of the derivative image.

The MPU 21 records thus generated file of the derivative image in the same folder as the original image in the memory card 19.

Step S223: The MPU 21 determines whether or not the flag is set on the original image currently on display.

When this original image has the flag set here, the MPU 21 shifts its operation to Step S224.

On the other hand, when this original image does not have the flag set, the MPU 21 shifts its operation back to Step S204.

Step S224: The MPU 21 removes the flag on the original image currently on display, and sets the flag on a newly generated derivative image.

After this operation, the MPU 21 shifts its operation back to Step S204.

Through a series of the operations explained above, the full screen display is carried out.

[User Interface in Thumbnail Display Mode]

Figure 15:
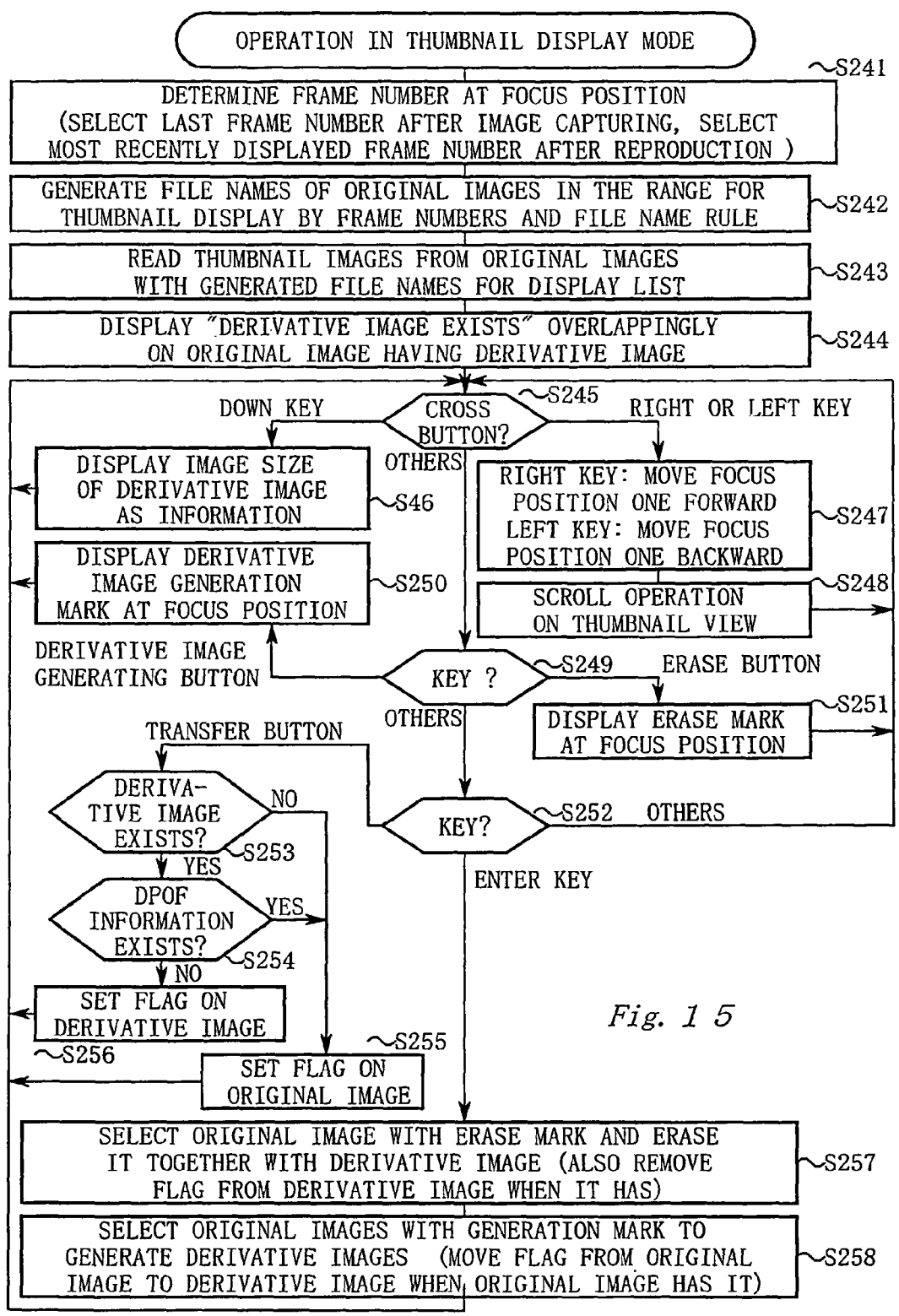
FIG. 15 is a flowchart explaining the operation performed in a thumbnail display mode.

FIG. 15 is a flowchart explaining the operation performed in a thumbnail display mode.

Next, the operation in the thumbnail display mode will be explained following the steps in FIG. 15.

Step S241: The user first turns the command dial 25 of the electronic camera 11 to select the reproduction mode. The user further operates the display switch button 27 as required to select the thumbnail display mode.

When the thumbnail display mode is thus selected, the MPU 21 determines a frame number of a focus position (an original image selected for focusing among a group of images displayed in the thumbnail display mode).

After image capturing, for example, the MPU 21 selects the last frame number (that is, a frame number most recently captured) as the frame number of the focus position.

After image reproduction, for another example, the MPU 21 selects a most recently reproduced frame number as the frame number of the focus position.

Step S242: The MPU 21 generates file names of a group of original images for the thumbnail display in sequence based on the selected frame number and the file name rule.

Step S243: The MPU 21 retrieves these file names from the memory card 19 and sequentially reads out thumbnail images stored in a header or the like of each file. The MPU 21 stores these thumbnail images in the frame memory 30, and displays these thumbnail images as a list on the liquid crystal display unit 31, as shown in FIG. 16. At this time, the image at the focus position is highlighted (using a dotted frame or the like as shown in FIG. 16).

Step S244: The MPU 21 determines whether or not the original image on the screen has a derivative image based on the file name rule. As for the original image having the derivative image, the MPU 21 displays information indicating that "a derivative image exists" on a corresponding thumbnail image, as shown in FIG. 16.

Step S245: The MPU 21 determines the user's key operation to the cross button 23 in this thumbnail display state.

When the user presses down the down key 23b here, the MPU 21 shifts its operation to Step S246.

When the user presses down the left key 23c or the right key 23d, the MPU 21 shifts its operation to Step S247.

In other cases, the MPU 21 shifts its operation to Step S249.

Step S246: The MPU 21 retrieves the derivative image of the original image at the focus position, and displays information on the image size of this derivative image on the thumbnail image at the focus position (refer to FIG. 16).

Note that when the original image at the focus position has plural derivative images, the MPU 21 displays the image sizes of the derivative images in the descending order every time the down key 23b is pressed down.

After this operation, the MPU 21 shifts its operation back to Step S245.

Step S247; When the right key 23d is pressed down, the MPU 21 moves the focus position by one frame forward.

On the other hand, when the left key 23c is pressed down, the MPU 21 moves the focus position by one frame backward.

Step S248: In accordance with such shift of the focus position, the MPU 21 performs scroll shifting of a thumbnail view so as to keep the focus position within the screen.

After this operation, the MPU 21 shifts its operation back to Step S245.

Step S249: The MPU 21 further determines a user's operation to other keys.

When the MPU 21 recognizes the key operation to the derivative image generating button 29 here, the MPU 21 shifts its operation to Step S250.

When the MPU 21 recognizes the key operation to the erase button 29b, the MPU 21 shifts its operation to Step S251.

In other cases, the MPU 21 shifts its operation to Step S252.

Step S250: When the derivative image generating button 29 is thus pressed down, the MPU 21 displays a derivative image generation mark on the thumbnail image at the focus position. Further, the MPU 21 adds the frame number of this focus position to a derivative image generation schedule list which is prepared on the internal memory. After this operation, the MPU 21 shifts its operation back to Step S245.

Step S251: When the erase button 29b is pressed down here, the MPU 21 displays a derivative image erase mark on the thumbnail image at the focus position. Further, the MPU 21 adds the frame number of this focus position to a derivative image erase schedule list which is prepared on the internal memory. After this operation, the MPU 21 shifts its operation back to Step S245.

Step 252: The MPU 21 further determines the user's operation to other keys.

When the MPU 21 recognizes the key operation to the transfer button 28 here, the MPU 21 shifts its operation to Step S253.

Meanwhile, when the MPU 21 recognizes the key operation to an enter key 29a, the MPU 21 shifts its operation to Step S257.

In other cases, the MPU 21 shifts its operation back to Step S245.

Step S253: The MPU 21 determines whether or not the original image at the focus position has a derivative image.

When the original image has the derivative image here, the MPU 21 shifts its operation to Step S254.

On the other hand, when no corresponding derivative image exists, the MPU 21 shifts its operation to Step S255.

Step S254: The MPU 21 determines whether or not the original image at the focus position has any print information (specification of a frame to be printed, the number of sheets to be printed, and so on) which is specified in DPOF (abbreviation of Digital Print Order Format) or the like.

When the original image has the print information here, the MPU 21 shifts its operation to Step S255.

On the other hand, when the original image on display does not have any print information, the MPU 21 shifts its operation to Step S256.

Step S255: The MPU 21 sets the flag on the original image at the focus position.

After this setting operation, the MPU 21 shifts its operation back to Step S245.

Step S256: The MPU 21 sets the flag not on the original image at the focus position but on the derivative image that this original image has.

After this setting operation, the MPU 21 shifts its operation back to Step S245.

Step S257: The MPU 21 selects the original image with the derivative image erase mark (the original image listed in the derivative image generation schedule list) and erases this original image together with the derivative image. Note that when the derivative image has the flag, the MPU 21 removes this flag as well.

Step S258: The MPU 21 selects the original images with the derivative image generation mark (the original images listed in the derivative image generation schedule list) to generate the derivative images in sequence and records them in sequence on the memory card 19. Note that when the original image has the flag, the MPU 21 removes the flag from the original image and sets the flag on a newly generated derivative image.

After this operation, the MPU 21 shifts its operation back to Step S245.

Through a series of the operations explained above, the operation during the thumbnail display is carried out.

[Description on Image Transfer Operation]

Next, the outline of an image transfer operation by the electronic camera 11 will be explained.

The user first connects the interface 32 of the electronic camera 11 to an external transfer destination via an appropriate transfer route (a cable, a wireless LAN, an Internet terminal, and the like).

The user turns a command dial 25 in this state to set the electronic camera 11 in a transfer mode.

The MPU 21 waits for a user's operation to a transfer button 28 according to such a transfer mode. When the user presses down the transfer button 28, the MPU 21 selects a file of an image having the flag, and transfers this image to the external transfer destination according to a predetermined protocol.

[Effect and so on of Fifth Embodiment]

As explained above, in generating the derivative image from the original image having the flag, the electronic camera 11 removes the flag from the original image and sets the flag on the derivative image (refer to Steps S222 to S224 in FIG. 14 and Step 258 in FIG. 15).

This enables the user to freely set the flag on the original image and the derivative image by a two-step operation of ① setting the flag on the original image and ② generating the derivative image from the original image.

Further, when the original image having the flag set on has the derivative image, the electronic camera 11 does not set the flag on this original image but sets the flag on the derivative image (refer to Steps S209 to S212 in FIG. 14 and Steps S253 to S256 in FIG. 15).

This enables the user to freely allot the flag to the original image and the derivative image by a two-step operation of ③ generating the derivative image from the original image and ④ setting the flag on the original image.

Since these operations are all intended for the original image, the user need not directly deal with the derivative image in spite that the derivative image is actually processed. This enables the user to set the flag in an intuitive and simple manner, focusing on the operation on the original image.

Moreover, in the fifth embodiment, in accordance with the erase of the original image, the derivative image generated from this original image is erased, and further, the flag on this derivative image is also removed (refer to Steps S214 to S216 in FIG. 14 and Step S257 in FIG. 15). Consequently, the removal of the flag of the derivative image and the erase of the derivative image can be carried out at the same time by only a single operation of erasing the original image. As a result, unnecessary image files in the memory card 19 can be easily erased.

Further, in the fifth embodiment, when the derivative image having the flag is erased, the flag is returned to the original image from which the derivative image is generated (refer to Steps S218 to S220 in FIG. 14). Therefore, the user only needs to erase the derivative image when the user intends to transfer the original image instead of the derivative image with the flag. In this case, the flag need not be newly set on the original image, which makes it possible to facilitate the operation of the electronic camera 11.

In addition, in the fifth embodiment, as for the original image having the print information (for example, the number of sheets to be printed, print size, image processing information to be referred to at the time of printing, and so on), the flag is set on the original image irrespective of existence or non-existence of the derivative image (refer to Steps S210 to S211 in FIG. 14 and Steps S254 to S255 in FIG. 15).

For printing use, generally, the original image is more suitable than the derivative image in view of image quality because the original image has abundant image information compared to the derivative image with reduced data capacity. Hence, in a case where the original image has the print information, the original image is preferentially given the flag even when it has derivative images. This results in enhancing the print image quality with reliability when the images are used for printing purpose at the external transfer destination.

""Additional Comments on Embodiments""

Note that in the above-described embodiments the resolution of the original image is reduced to generate the derivative image. The present invention, however, is not to be limited thereto. For example, the derivative image is generated by reducing the color of the original image.

Further, in the above-described embodiments, the use of the file name rule and the hierarchical folders establishes the associations between the original image and the derivative image. The present invention, however, is not to be limited thereto. For example, the file associations between the original image and the derivative image may be recorded by using data such as header information of files and file management information on a recording medium. Further, the original image and the derivative image may be discriminated by use of, for example, header information of files, file management information, image size, or the like.

The present invention may be embodied in other specific forms without departing from the spirit and essential characteristics thereof. Therefore, the above-described embodiments are to be considered in all respects only as illustrative and no restrictive. The scope of the present invention is to be defined by the scope of the patent claims and is not at all to be restricted by the description in the specification. Further, all modifications and changes which come within the meaning and range of equivalency of the claims are intended to be embraced in the scope of the present invention.

What is claimed is:

1. An electronic camera comprising:
   an imaging unit capturing a subject to generate an original image;
   a recording unit recording the original image;
   a derivative image generating unit reducing the image size of the original image recorded by the recording unit to generate a derivative image or derivative images in which the recording unit also records the derivative image or derivative images in association with the original image, the original image and the derivative image or derivative images each being a single image file independent from each other,
   a display unit displaying an image and information on the image, and sequentially displaying the original image and the derivative image or derivative images such that the original image and derivative image or derivative images are distinguishable from each other based on an order in which they are displayed, wherein the sequential display of the original image and the derivative image or derivative images comprises displaying the original image and the derivative image or derivative images overlapping one another in descending order of image size;
   a transfer setting unit indicating the derivative image or derivative images to be transferred; and
   a transfer unit transferring the indicated derivative image or derivative images recorded on the recording unit to an external transfer destination.

2. The electronic camera according to claim 1, wherein the recording unit has a folder in which the original image is recorded, and lower folders being under the folder hierarchically and in which the derivative images are separately recorded according to respective image sizes, such that the original image and the derivative images are managed in a hierarchical manner.

3. The electronic camera according to claim 1, further comprising
   an erase control unit receiving an erase command for the original image from a user, wherein
   the original image is erased from the recording unit in compliance with the erase command and the recorded derivative image associated with the erased original image is retrieved and erased from the recording unit.

4. The electronic camera according to claim 1, wherein:
   the derivative image being transferred to the external transfer destination by the transfer unit is erased from the recording unit.

5. The electronic camera according to claim 1, further comprising
   a storage space monitoring unit determining an available storage space of the recording unit, wherein
   all or a part of the derivative images are erased from the recording unit when the storage space monitoring unit finds a shortage in the available storage space.

6. The electronic camera according to claim 1, further comprising
   a transfer control unit receiving a file transfer command for the original image from a user, wherein
   the transfer unit file-transfers the original image in compliance with the file transfer command, and retrieves and file-transfers the recorded derivative image that is associated with the original image.

7. The electronic camera according to claim 1, further comprising
   a protect control unit receiving a protect command for the original image from a user, wherein
   a protect attribute is set on the recording unit with respect to the original image and the recorded derivative image in compliance with the protect command.

8. The electronic camera according to claim 1, further comprising
   an original image erase control unit receiving only an erase command for the original image from a user, wherein
   the original image is erased from the recording unit in compliance with the erase command.

9. The electronic camera according to claim 1, wherein:
   the imaging unit selectively has a moving image capture mode in which a subject is captured to generate the original image as a moving image; and
   the derivative image generating unit generates the derivative image of the original image captured in the moving image capture mode by reducing the image size of one frame of the original image captured in the moving image capture mode.

10. The electronic camera according to claim 1, wherein:
    the imaging unit selectively has a continuous capture mode in which a subject is captured to generate the original image including a plurality of static images; and
    the derivative image generating unit generates the derivative image of the original image captured in the continuous capture mode by reducing image size of each frame of the original image captured in the continuous capture mode.

11. The electronic camera according to claim 1, wherein:
    the display unit displays the derivative image when a user performs a predetermined operation during display of the original image, and when a plurality of derivative images generated from one original image are present, the display unit displays the plurality of derivative images in the order of image sizes in compliance with the user's predetermined operation.

12. The electronic camera according to claim 1, wherein:
    the display unit discriminates between the original image and the derivative image based on a file name rule, and does not display the original image and the derivative image on a screen at the same time.

13. The electronic camera according to claim 1, further comprising
    a slide display unit automatically displaying a plurality of images in sequence, wherein
    the slide display unit separates the plurality of images into original image or original images and derivative image or derivative images to automatically display either of the original image or original images and derivative image or derivative images.

14. The electronic camera according to claim 1, further comprising
    a transfer setting unit setting a flag on an image designated by a user's input, the flag indicating a transfer candidate of the transfer unit, wherein
    the transfer unit has a function of transferring the original image in addition to a function of transferring the derivative image, and
    when generating the derivative image from the original image having the flag set, the derivative image generating unit removes the flag from the original image and sets the flag on the generated derivative image.

15. The electronic camera according to claim 1, further comprising
    a transfer setting unit setting a flag on an image designated by a user's input, the flag indicating a transfer candidate of the transfer unit, wherein the transfer unit has a function of transferring the original image in addition to a function of transferring the derivative image, and when an original image designated by the user's input has a derivative image, the transfer setting unit sets the flag not on the original image but on the derivative image.

16. The electronic camera according to claim 1, further comprising:
a transfer setting unit setting a flag on an image designated by a user's input, the flag indicating a transfer candidate of the transfer unit; and
an erase unit erasing an image designated by a user's input, wherein
the transfer unit has a function of transferring the original image in addition to a function of transferring the derivative image, and
if the original image is erased, the transfer setting unit erases the derivative image generated from the original image and removes the flag of the derivative image.

17. The electronic camera according to claim 1, further comprising:
a transfer setting unit setting a flag on an image designated by a user's input, the flag indicating a transfer candidate of the transfer unit; and
an erase unit erasing an image designated by a user's input, wherein
the transfer unit has a function of transferring the original image in addition to a function of transferring the derivative image, and
if the derivative image having the flag set is erased, the transfer setting unit sets the flag on the original image from which the erased derivative image has been generated.

18. The electronic camera according to claim 1, further comprising
a transfer setting unit setting a flag on an image designated by a user's input, the flag indicating a transfer candidate of the transfer unit, wherein
the transfer unit has a function of transferring the original image in addition to a function of transferring the derivative image, and
the transfer setting unit sets the flag on an original image having Digital Print Order Format information, irrespective of whether or not the original image has a derivative image.

19. The electronic camera according to claim 1, wherein:
the display unit discriminates between each of the original images and associated derivative image or derivative images based on a file name rule, and designates at least one derivative image as non-display.

20. The electronic camera according to claim 1, wherein
if the display unit designates one of the original images as non-display, the display unit also designates, as non-display, the associated derivative image or derivative images generated from the non-display original image.

21. An electronic camera comprising:
an imaging unit capturing subjects to generate original images;
a recording unit recording the original images;
a derivative image generating unit reducing the image size of each of the original images recorded by the recording unit to generate a derivative image or derivative images associated with each of the original images, in which the recording unit also records the derivative image or derivative images in association with the each of the original images, the original image and the associated derivative image or derivative images each being a single image file independent from each other,
a display unit displaying an image and information on the image, and sequentially displaying at least one of the original images and associated derivative image or derivative images such that the at least one original image and associated derivative image or derivative images are distinguishable from each other based on an order in which they are displayed, wherein the sequential display of the at least one of the original images and associated derivative image or derivative images comprises displaying the original image and the associated derivative image or derivative images overlapping one another in descending order of image size;
a transfer setting unit indicating derivative image or derivative images to be transferred; and
a transfer unit transferring the indicated derivative image or derivative images recorded on the recording unit to an external transfer destination.

* * * * *